(12) United States Patent
Espig

(10) Patent No.: US 9,821,719 B2
(45) Date of Patent: Nov. 21, 2017

(54) MOVABLE ROOF RACK FOR MOTOR VEHICLES

(71) Applicant: SEs Solutions GmbH, Freital (DE)

(72) Inventor: Serle Espig, Hamburg (DE)

(73) Assignee: SEs Solutions GmbH, Freital (DE)

( * ) Notice: Subject to any disclaimer, the term of this patent is extended or adjusted under 35 U.S.C. 154(b) by 93 days.

(21) Appl. No.: 14/157,198

(22) Filed: Jan. 16, 2014

(65) Prior Publication Data

US 2014/0131404 A1    May 15, 2014

Related U.S. Application Data

(63) Continuation of application No. PCT/EP2012/064039, filed on Jul. 17, 2012.

(30) Foreign Application Priority Data

| Jul. 17, 2011 | (DE) | 10 2011 051 891.6 |
| Oct. 25, 2011 | (DE) | 10 2011 054 802.5 |
| Nov. 21, 2011 | (DE) | 10 2011 055 543.9 |
| Nov. 29, 2011 | (DE) | 10 2011 055 847.0 |
| Nov. 29, 2011 | (DE) | 10 2011 055 848.9 |

(51) Int. Cl.
*B60R 9/042* (2006.01)

(52) U.S. Cl.
CPC .................. *B60R 9/042* (2013.01)

(58) Field of Classification Search
CPC ............ B60R 9/042; B60R 9/045; B60R 9/04
USPC ....................................................... 224/310
See application file for complete search history.

(56) References Cited

U.S. PATENT DOCUMENTS

| 3,521,774 A | * | 7/1970 | Raypholtz | B60P 3/1025 |
| | | | | 414/462 |
| 3,531,006 A | * | 9/1970 | Farchmin | B60R 9/042 |
| | | | | 414/462 |
| 3,762,587 A | * | 10/1973 | Longee, Sr. | B60R 9/042 |
| | | | | 414/462 |
| 4,329,100 A | * | 5/1982 | Golze | B60R 9/055 |
| | | | | 177/136 |
| 4,339,223 A | * | 7/1982 | Golze | 414/462 |

(Continued)

FOREIGN PATENT DOCUMENTS

| DE | 41 22 823 A1 | 1/1993 |
| DE | 44 21 030 C1 | 7/1995 |

(Continued)

OTHER PUBLICATIONS

International Search Report dated Oct. 8, 2012 with English translation (five (5) pages).

*Primary Examiner* — Corey Skurdal
(74) *Attorney, Agent, or Firm* — Crowell & Moring LLP

(57) ABSTRACT

In order to create a movable roof rack for motor vehicles, wherein the roof rack has a support device for receiving a load, in particular for receiving a roof box, and wherein the support device is movable between a travel position and a loading position, at least one profiled support section (115, 116, 215, 216) is provided in order to move the support device between the travel position and the loading position, and the at least one profiled support section (115, 116, 215, 216) is arranged on a vehicle pillar (101, 102, 201, 202) of a motor vehicle and is designed to support the support device.

30 Claims, 31 Drawing Sheets

(56) References Cited

U.S. PATENT DOCUMENTS

| | | | |
|---|---|---|---|
| 4,439,086 A * | 3/1984 | Thede | B60R 9/08 224/310 |
| 4,682,719 A * | 7/1987 | Ernst et al. | 224/310 |
| 5,154,563 A * | 10/1992 | Phillips | 414/462 |
| 5,346,355 A * | 9/1994 | Riemer | B60P 1/4435 224/310 |
| 5,649,655 A | 7/1997 | Kerner | |
| 6,308,874 B1 * | 10/2001 | Kim et al. | 224/310 |
| 6,338,427 B1 * | 1/2002 | Aftanas et al. | 224/310 |
| 6,827,244 B1 * | 12/2004 | Stapleton et al. | 224/310 |
| 7,048,490 B2 * | 5/2006 | Henderson | 414/462 |
| 8,322,580 B1 * | 12/2012 | Hamilton | B60R 9/055 224/309 |
| 9,290,130 B2 * | 3/2016 | Buller | B60R 9/042 |
| 2002/0084297 A1 * | 7/2002 | Williams et al. | 224/310 |
| 2002/0185506 A1 * | 12/2002 | Kmita et al. | 224/310 |
| 2003/0052145 A1 * | 3/2003 | Aftanas et al. | 224/310 |
| 2004/0173651 A1 * | 9/2004 | Kim et al. | 224/310 |
| 2007/0080185 A1 * | 4/2007 | Czornyj | 224/310 |

FOREIGN PATENT DOCUMENTS

| | | |
|---|---|---|
| DE | 44 07 510 A1 | 9/1995 |
| DE | 200 02 018 U1 | 6/2000 |

\* cited by examiner

ERSATZBLATT (REGEL 26)

MOVABLE ROOF RACK FOR MOTOR VEHICLES

CROSS REFERENCE TO RELATED APPLICATIONS

This application is a continuation of PCT International Application No. PCT/EP2012/064039, filed Jul. 17, 2012, which claims priority under 35 U.S.C. §119 from German Patent Application No. 10 2011 051 891.6, filed Jul. 17, 2011, German Patent Application No. 10 2011 054 802.5, filed Oct. 25, 2011, German Patent Application No. 10 2011 055 543.9, filed Nov. 21, 2011, German Patent Application No. 10 2011 055 847.0, filed Nov. 29, 2011, and German Patent Application No. 10 2011 055 848.9, filed Nov. 29, 2011, the entire disclosures of which are herein expressly incorporated by reference.

TECHNICAL FIELD OF THE INVENTION

The invention relates a movable roof rack for motor vehicles, especially for the foldable roof box described herein.

BACKGROUND OF THE INVENTION

The disadvantage of conventional roof racks that are mountable on the roof is that the luggage or the roof box must be lifted onto the roof and fixed there. This is particularly difficult and arduous when the objects are heavy. Roof racks have therefore been suggested with devices for making it easier to convey luggage onto the roof. For example German laid-open patent application DE 41 22 823 A1 and German utility model DE 200 02 018 U1 propose roof racks with a lifting device. The disadvantage of these movable roof racks is that they possess significant additional weight and take up additional space on the roof of a motor vehicle. The air resistance and fuel consumption is thereby increased.

In a similar manner, U.S. Pat. No. 5,154,563 and DE 44 21 030 C1 disclose movable roof racks where a track system is installed on the outside of the motor vehicle that runs down from the roof or the rear or side of the motor vehicle. Roof boxes or other containers can move along this track system. This yields significantly elevated air resistance and fuel consumption in this case as well. Furthermore, the luggage containers installed on the tracks are tilted while they move so that the pieces of luggage in the luggage containers get mixed up and/or can become damaged.

SUMMARY OF THE INVENTION

The object of the invention is therefore to propose an improved movable roof rack for motor vehicles.

This object is achieved with a movable roof rack for motor vehicles that has a support device for receiving a load, in particular for receiving a roof box, and the support device can be moved between a travel position and a loading position in that at least one profiled support section is provided in order to move the support device between the travel position and the loading position, and the at least one profiled support section is arranged on a vehicle pillar of a motor vehicle and is designed to support the support device.

For the roof rack, or respectively the support device of the roof rack, at least two positions are provided, i.e., a travel position one hand, and a loading position on the other hand between which the roof rack can be moved. In the travel position, the roof rack, or its support device, is generally arranged on the roof of a motor vehicle since the motor vehicle is only ready to drive with such an arrangement. The loading position is in general lower in height relative to the travel position, wherein the roof rack is then generally arranged adjacent to, behind or in front of the motor vehicle. In particular, the roof rack can be lowered to a loading position that, in terms of its height, is a maximum of 80% of the height of a motor vehicle, preferably a maximum of 65% of the height of a motor vehicle, and particularly preferably a maximum of 50% of the height of the motor vehicle. The logic of moving the roof rack from the travel position into the loading position is that the roof rack is easier for a user to load and unload in the loading position. It is possible in principle to provide one or more intermediate positions between the travel position and loading position in which the roof rack, or respectively the support device, can also be moved and brought to a stop. The roof rack can thereby e.g. be adapted to the various body sizes of different users for loading and unloading. The roof rack can be designed so that it is only possible to move to specific positions, at least the travel position and loading position, and possibly specified intermediate positions. Alternately, continuous movability can also be provided so that the preferred position for loading and unloading can be individually set by the user.

In order to move or respectively displace the support device of the roof rack from the travel position to the loading position or possibly intermediate positions, at least one profiled support section is provided that is designed to support the support device and/or to move the support device. The profiled support section is furthermore arranged on one vehicle pillar of a motor vehicle. The vehicle pillars are bearing pillars that connect, the vehicle to the body substructure thereof and, in particular in the case of passenger cars, are designated with sequential letters from front to rear independent of the side of the vehicle (such as the A-pillar, B-pillar, C-pillar, etc.). The profiled support section is arranged on one of these vehicle pillars; that is, the profiled support section is in particular arranged in the area of the vehicle pillar such that it bears the force introduced into the profiled support section through the vehicle pillar. To accomplish this, it is particularly preferable for the profiled support section to be arranged on the outside of the vehicle pillar. The profiled support section can lie directly on the vehicle pillar. However, intermediate materials or the like can also just as well be provided between the vehicle pillar and the profiled support section. The task of the profiled support section is primarily to support the support device while moving into loading position and remaining in loading position, to bear the weight of the support device and the load arranged thereupon, and to channel the force induced by the movement of the support device. The profiled support section can if applicable also be designed to move or displace the support device.

The profiled support section is preferably a long component that, in particular in the travel position, extends along the vehicle pillar. It is useful in principle for the profiled support section to be movably mounted on the vehicle pillar and in particular to be at least partially movable away from the vehicle pillar during the moving process from the travel position to the loading position.

The support device is the part of the movable roof rack that is designed to accommodate the load. On the one hand, the load can be placed directly on the support device, or be respectively accommodated by it. On the other hand, the support device can also accommodate additional devices that in turn are designed to accommodate objects to be transported. It is accordingly preferable for the support device to be designed to accommodate a roof box, in particular a foldable roof box. Objects to be transported can then be introduced into the roof box (in an unfolded state). For this purpose, the roof box can be moved into the loading position together with the support device. After loading or respectively unloading, the roof box, together with the support device, is moved back into the travel position.

In the present context the term "roof box" is understood to mean a container provided in or on the roof of a motor vehicle that, at least in the extended state, offers a useful interior space, i.e., a storage space, for arranging or storing objects. The interior space is the storage space within the roof box that is enclosed by the walls of the roof box. The walls of the roof box are preferably composed of a plurality of wall elements. The wall elements can for example comprise a base element, a cover element, a rear wall and/or one or more side walls. In the present context, the term "motor vehicle" is understood to mean any motorized, non-rail-bound land vehicle, wherein the motor vehicles that are appropriate for use in the present invention must of course have a vehicle roof. This includes in particular passenger cars, trucks, convertibles, etc.

The at least one profiled support section that in particular is designed elongated usefully has a first end area and an opposing second end area, wherein the profiled support section is connected by the first area to the vehicle pillar, and/or by the second to end area to the support device. The connection to the vehicle pillar and to the supportive device can in particular be designed as an articulation. With such an articulated connection, it is in particular preferable for the joint axis, about which the two parts connected to each other can pivot relative to each other, to be aligned substantially in the longitudinal direction of the motor vehicle. Alternately or in addition to pivotability, it is, however, in principle possible for the profiled support section to execute translatory movements when it is correspondingly designed or respectively mounted. In particular, it is preferable for the lower end area of the profiled support section to be fixedly, however if applicable pivotally, connected to the vehicle pillar, and for the opposing upper end area to be movable away from the vehicle pillar together with a support device, wherein the at least one profiled support section can then pivot about pivot axis of the lower connecting area during the moving process. The upper end area then pivots together with the support device laterally away from the motor vehicle.

In a preferred embodiment, the roof rack is designed so that the movement of the support device between the travel position and loading position or vice versa basically does not have any rotating part but rather has largely or exclusively parts for translatory movement. In systems known from the prior art and, in particular, known track systems in which a support device designed as a slide is movable on the track, the movement between the loading and travel position of the support device always also has a rotation component. Frequently this occurs by tilting, angling, pivoting or otherwise rotating the support device. The objects or respectively the support container such as roof boxes fastened to the support device are correspondingly also rotated, pivoted or angled together with the support device which in turn can cause the loaded material to become damaged since, for example, it is only loosely arranged in a roof box. It can also be unappealing for the user when the objects that he has inserted within a storage container become mixed up by the rotating movement. Correspondingly, the present embodiment of the invention provides that the support device is not substantially tipped, angled, pivoted, rotated or exposed to any other rotational movement during the entire moving process. The support device is usefully first moved substantially horizontally or respectively laterally from the travel position. Once the support device has been moved completely beyond the vehicle roof, it can be lowered in another step without being rotated or tipped, wherein the lowering movement can be downward vertically or downward at an angle, gradually or stepped. This prevents the loaded material from being damaged, and it can also be stored during the moving process with a stable position.

It is furthermore preferable for a roof rack mounted on a motor vehicle for the loading position to be located below the travel position with reference to said motor vehicle. This is useful since one of the major points of moving the support device is to lift or respectively lower the loaded goods to be moved from the vehicle roof in order to make it easier for a user to access the support device, or respectively loading containers, arranged on a support device for loading and unloading. Alternately or in addition, is furthermore useful for the loading position to be located to the side of the travel position with reference to the motor vehicle, i.e., for the support device to move from the middle of the vehicle toward the driver or passenger side. However, movement to the rear is also possible in principle, in particular with vehicles designed as a station wagon or an SUV. In the case of a lateral movement of the support device, more comfortable access to the support device in the loading position is possible for a predominant share of all motor vehicle models. In this regard, it can furthermore be useful for the roof rack to be designed so that the support device can move both to the driver's side as well as the passenger side. In addition, the support device can simultaneously also be moved to the rear. The advantage is that it is also possible to move the support device to the loading position in different parking situations of the motor vehicle, thus ensuring that the roof rack is as comfortable as possible for a user to handle.

In another preferred embodiment of the invention, attachment means for attaching the loading device to the support device are provided on the support device. Such loading devices can for example be a roof box, special carriers, such as for bicycles, skis or the like, or a grating. A part of the attachment means can be provided on the loading device, and a complementary additional part can be provided on the support device, or the attachment means can be designed completely on the loading device. Depending on the circumstances of the respective application, the attachment means can be designed to create a permanent or releasable attachment. Alternately, the roof rack can also be designed as a single part with a loading device so that the loading device is a part of the roof rack.

It is furthermore preferable for the roof rack to be designed integratable in the body of a motor vehicle, in particular integratable in a motor vehicle roof. The integrative arrangement of the roof rack in the body, or respectively in the vehicle roof, is such that the support device and/or the other components of the roof rack are not mounted on the motor vehicle from the outside as separate devices, especially afterwards, but rather are arranged in the body, or respectively in the vehicle roof, and form a part of the motor vehicle, in particular in the visual appearance of the vehicle. The roof rack can be completely or partially integrated in the body of the motor vehicle. Given the integrative arrangement of the roof rack in the body, or respectively in the vehicle roof, the user is no longer required to mount or remove it. Instead, the roof rack remains as an integrative component of the body in the motor vehicle and is always available to the user. This makes the roof rack more comfortable to handle by the user. When the roof rack is not used, it is retracted into the body (this state can in particular be realized in the travel position) and then has less air resistance which in turn yields reduced vehicle noise and reduced fuel consumption. In a retracted state, the roof rack is not visually perceptible or is at least not very visually conspicuous. By integrating the roof rack in the vehicle body or respectively the vehicle roof, the air resistance of the motor vehicle when the roof rack is retracted is not impaired, or at least not significantly, in comparison to other motor vehicles without a roof rack. In addition, a luggage container such as a roof box arranged on the roof rack and connected thereto, possibly fixedly, can also be designed integrated in the vehicle body. For this purpose, it is preferable to provide a foldable roof box on the roof rack, wherein the entire device is integrated in the vehicle body in the travel position when the roof box is the folded state. The integrative design can preferably be realized by providing notches in the vehicle body corresponding to the components or parts of the roof box to be integrated in which the roof box, or its relevant parts, are inserted in the travel position.

In another preferred embodiment, the roof rack comprises at least one roof guide that extends along the vehicle roof, or respectively along the vehicle roof of the motor vehicle, in particular starting from a top area of the vehicle pillar in the area of which at least one profiled support section is arranged. The support device is furthermore designed to be movable along the roof guide. It is also possible in principle for only parts of the support device to be designed to be movable along the roof guide. The roof guide can have any shape suitable for the respective support device. For example, these can be corresponding notches or respectively recesses in the vehicle roof, or tracks that are arranged on the roof and in which the support device engages and along which it moves. The plane of movement of the support device along the roof guide is generally aligned substantially horizontal, wherein deviations at points can arise from the horizontal plane due to the curvature of the vehicle roof. It is correspondingly useful for the support device to be attached to the roof guide in such a manner that the support device can move along the roof guide, in particular approximately in a horizontal direction, however not in a direction perpendicular or vertical relative to the roof guide. This can for example be achieved when the support device has rollers which engage in a track of the roof guide designed with a C-shape. Numerous additional embodiments of the roof design are likewise conceivable, or respectively the parts of the support design corresponding with the roof guide that fulfill the same purpose. In particular, it can be advantageous for the roof guide to extend perpendicular to the longitudinal axis of the motor vehicle over the vehicle roof from one side of the vehicle roof to the other side. It is in particular advantageous when the roof guide runs ire a line from an upper area of a vehicle pillar to a second upper area of an opposite vehicle pillar. It is furthermore preferable to provide two such roof guides which are then arranged substantially parallel to each other and which each extend between two opposing pairs of vehicle pillars. In particular, a front roof guide can be arranged between the two B-pillars, and/or a rear roof guide can be arranged between the two C-pillars of a motor vehicle. This embodiment preferred because the support device can be moved to each side of the motor vehicle and always in the direction of a vehicle pillar and hence a profiled support section. The profiled support section can accordingly support the section of the support device during the moving process that has moved beyond the vehicle roof until the support device has completely left the roof guide and is no longer supported thereby, but is instead preferably supported exclusively the profiled support section(s). In the case of roof guides that run in a straight line between two opposing vehicle pillars, it is particularly preferable for the support device to comprise one or more cross bars that, in particular in the travel position, each lie on roof guides and cover them. For example in the case of a front and rear roof guide, a total of two cross bars would be provided, wherein each cross bar runs substantially from an upper area of a vehicle pillar to the upper area of the opposing vehicle pillar and can move laterally along the roof guide away from the vehicle roof.

In an alternative embodiment, the roof guide does not run in a straight line between the upper areas of two opposing vehicle pillars, but rather along the roof edge of the vehicle roof from an upper area of a vehicle pillar to the upper area of the opposing vehicle pillar. It is particularly preferable to provide a front and rear roof guide that run along the roof edge in the above-described manner between the two B-pillars, or respectively between the two C-pillars. The front roof guide runs from a B-pillar initially proceeding toward the front, then around to the front side of the vehicle roof, and then back along the roof edge to the opposing B-pillar. Basically in a mirror image, the rear roof guide runs from the upper area of a C-pillar along the roof edge first towards the rear of the vehicle roof, then along the rear, or respectively the rear edge of the vehicle roof, and then toward the front to the opposing C-pillar. A roof guide can if applicable also be provided between the B-pillar and C-pillar then preferably also along the roof edge, on each side or on only one side of the vehicle. In this embodiment, it is particularly preferable for the support device to comprise a support frame, wherein the support frame is in particular dimensioned such that it has substantially the same dimensions as the roof guides running along the roof edge. Particularly useful and simple movement of the support frame along the roof guide can be realized in this manner. The support frame can in particular be approximately rectangular and possibly also equipped with rounded corner areas. In particular in the travel position, it is useful for the support frame to cover the roof guide, or respectively roof guides. If the roof guides are provided in a recess in the vehicle roof, the recess can be dimensioned so that the support device, or respectively the support frame that lies on the roof guide in the travel position, terminates flush against the rest of the vehicle roof so that a flat surface results, and the support device of the roof rack is visually imperceptible, or only slightly perceptible.

The at least one profiled support section usefully sits on the outside of a vehicle pillar, wherein the profiled support section can form the outer layer of the vehicle body in this area, or additional components such as a cover or the like can be provided on the outside of the profiled support section. Furthermore, the profiled support section usefully extends along the vehicle pillar. In this regard, the profiled support section frequently runs substantially vertically, in particular in the case of the B-pillar. Depending on the body shape, the profiled support section can, however, also run perpendicular to a vertical as, for example, is frequently the case of the C-pillar that, viewed from top to bottom, runs obliquely to the rear in certain vehicle types such as coupes. The entire length of the at least one profiled support section preferably lies on the vehicle pillar when in the travel position. In the loading position and/or an intermediate position between the loading position and travel position, at least one part of a profiled support section is arranged at a distance from the vehicle pillar, in particular when the bottom end of the profiled support section is attached to the vehicle pillar, and the top end is swung way from the vehicle pillar while moving the support device. To this end, a profiled support section articulation is usefully provided on the lower area of the profiled support section by means of which the profiled support section is connected to the vehicle pillar. It is in particular preferable for the attachment to be in the area of the attachment of a vehicle door to the vehicle pillar. At this location, reinforced panel sections, etc. are generally provided so that the force to be channeled by the profiled support section can be advantageously introduced there. The profiled support section is pivoted about a pivot axis of the profiled support section articulation.

It can in particular be useful for a profiled support section articulation to comprise a swivel pin about which the profiled support section pivots. The swivel pin can be designed in a conventional manner as a cylinder. In particular when the vehicle pillar, such as a C-pillar, runs at an angle to a vertical, it can however be advantageous when the swivel pin is designed conical and not cylindrical. The counterpart such as a sleeve that can pivot about the swivel pin is then also usefully designed conically in a form-fit manner. The deviating angular position of the C-pillar relative to the vertical B-pillar, or other vehicle pillars, can thereby be compensated by a deviating angular position.

In another preferred embodiment, the at least one profiled support section is designed with a changeable length. The length of the at least one profiled support section can thereby be adapted to the respective travel position of the support device. The length of the profiled support section can be changed in steps or smoothly. Furthermore in this embodiment, differences in the length or respectively width of the support guide relative to the height of the vehicle pillars and their guides can be compensated by the adaptability of the length of the profiled support sections. It is in particular preferable when the at least one profiled support section comprises telescoping arms. Because of this, the length can be changed to the respective circumstances or, respectively, needs in a particularly robust and effective manner. It is particularly preferable for the telescoping arm to be designed as a dual telescoping arm, a triple telescoping arm or a quadruple telescoping arm. This depends, among other things, on the respective design and the dimensions of the vehicle body, as well as the support device.

In another preferred embodiment, the upper area of the least one profiled support section has a seat device for accommodating a moving element. The at least one profiled support section can be connected to the support device by means of this moving element. The moving element is usefully movable relative to the profiled support section, relative to the support device, or to both. In particular, the moving element is designed such that a movable connection results between the support frame on the one hand and the at least one profiled support section on the other hand. The moving element can furthermore be designed to establish a movable connection between the support device and roof guide. Particularly preferably, the movable connection can be designed as an articulated connection. To this end, the moving element can be held in the seat device for the profiled support section such that it can only execute rotational movements and not, however, translatory movement. Depending on the application, a translatory movement can however also be feasible, possibly restricted in extent by stops, etc. The moving element can in particular be designed as a foot element on which the support device sits, and by means of which the support device can optionally move on the roof guide. The seat device of the profiled support section is usefully coupled to the roof guide such that the seat device can receive or respectively accommodate the moving element which can move along the roof guide. When a translatory movement is not possible or only slightly possible after the moving element is accommodated in the seat device, the support device is moved away from the motor vehicle together with the profiled support section when the profiled support section is swung away from of the vehicle. To prevent the support device from executing any rotational movements during the moving process, it is furthermore useful when the length of the profiled support section is gradually adapted while swinging away from the vehicle so that they support device is only moved to the side or respectively lowered and is not pivoted or respectively rotated.

The moving element can be moved by means of a moving drive provided for this purpose. This moving drive can for example be formed by a winch or a magnetic levitation device. Instead of an external drive, the movement itself can also have a moving drive, for example in the form of an electric motor, etc.

The seat device is furthermore usefully designed so that it can releasably hold the moving element. Since the at least one profiled support section, in particular with its upper area, is moved away from the vehicle when moving to the loading position, the moving element is usefully securely mounted in the seat device. If the support device is moved back to the travel position, the seat device must release the moving element at a given time, or respectively at a given position of the profiled support section and/or the support device, so that the moving element can enter the roof guide, and the support device can move into its travel position. To this end, the seat device usefully has a locking device by means of which a moving element can optionally be released or retained in the seat device. In particular, the locking device can be controlled by a control device that retains or releases the moving device depending on the position of the support device. The establishment of an articulated connection between the support device and a profiled support section by means of the moving element is useful because the angle between the plane of the support device and the longitudinal axis of the profiled support section changes during the moving process when the profiled support section pivots about its lower end area, and this can be compensated by the articulated connection of the moving element.

In particular in the case of a vehicle pillar running perpendicular to the vertical direction, it can be useful for the moving element in the seat device of a profiled support section that is arranged on such a perpendicular vehicle pillar to be accommodated or respectively mounted with play. In particular, it is useful for the moving element to have play with reference to the transverse direction of the at least one profiled support section, or with reference to the longitudinal direction of the motor vehicle, i.e., be movable in at least one of these directions at least up to a set length. This can in particular be necessary in order to compensate for different angular positions between the profiled support section of a vehicle pillar running substantially vertically such as a B-pillar, and the profiled support section of a vehicle pillar running obliquely, such as a C-pillar. It is, however, useful to provide stops, etc. to ensure that the moving element remains in the seat device at all times and cannot be moved out of it.

In another preferred embodiment, the vehicle pillar on which the at least one profiled support section is provided has a vehicle pillar guide. This pillar guide usefully abuts the roof guide, especially at an angle, so that the support device can move along the vehicle pillar guide. The vehicle pillar guide usefully extends along the vehicle pillar. It is in particular preferable for the vehicle pillar guide to be arranged within the at least one profiled support section with reference to the motor vehicle. When the profiled support section is swung away from the vehicle pillar while the support device is moving, the vehicle pillar guide remains on the vehicle pillar and is released or respectively becomes freely accessible by the swinging away of the profiled support section. Because the vehicle pillar guide abuts the roof guide or is respectively coupled thereto, a moving element can in particular be moved from the roof guide into the vehicle pillar guide. Since the moving element is provided on the support device, the support device together with the moving element is moved over the roof guide along the vehicle pillar guide. Furthermore, in particular at the bottom end area of the vehicle pillar guide, a stop is preferably provided up to which the support device can be moved.

A vehicle pillar cover is provided in another preferred embodiment. This is useful since the vehicle pillar cover serves to create a visually coherent impression of the body of the vehicle, especially in the travel position, despite the movable, especially integratively arranged roof rack. It is in particular useful to design the shape of the vehicle pillar cover adapted to the body shape of the vehicle in the area of the vehicle pillar. It is in particular useful for the vehicle pillar cover to cover at least one profiled support section and/or the vehicle pillar cover in the travel position, or another predetermined moving position. The vehicle pillar cover can be movably mounted on the body. For example, the vehicle pillar cover can be designed pivotable or movable so that it swings away from the vehicle or respectively from the vehicle pillar, for example when moving the support device from the travel position to the loading position, and thereby releases the profiled support section which can then in turn be pivoted.

The vehicle pillar guide, and/or the roof guide, and/or the support device can comprise predetermined paths, etc. by means of which the moving element can be moved. In particular, the vehicle pillar guide, and/or the roof guide, and/or the support device comprise one or more tracks that have a profile for accommodating the moving element. The profile can be designed in any suitable manner, wherein the design as a U-profile, L-profile, semicircle profile, C-profile, T-profile, or near circle profile is preferable. The formation of such profiles has the advantage that the moving element which for example has one or more rollers can be reliably accommodated therein. In particular, it should be ensured that the moving element is only movable on the profile and, however, cannot be removed from the profile. The rollers form the profile counterparts that in particular can engage in a profile of the tracks in a form fit manner. The profile counterparts are in principle conceivable in any suitable shape and design. It is particularly preferable when profile counterparts are arranged on the two opposite end sides of the moving element. This can in particular be useful when profiles are provided on both the support device as well as on the roof guide and/or on the vehicle pillar guide so that the moving element can engage in the respective profile in two of these components that move relative to each other.

When profile counterparts are provided on both end sides of the moving element, it is preferable in one embodiment for the two end sides of the moving element on each of which a profile counter piece is arranged to be connected to each other by means of a center plate. The center plate has a stomach-like bulge. This is in particular useful since of the moving element in some embodiments can come to lie in the area of the side roof frame struts of the motor vehicle in travel position, and the center plate can grasp the roof frame strut in nearly a form fit with its stomach-like bulge. Since the roof frame struts frequently do not have a symmetrical cross-section, it is useful when the stomach-like bulge is also not designed symmetrically and accordingly adapts to the shape of the roof frame struts in a highly optimum manner. In particular when the moving element moves along the vehicle pillar guide, another advantage of this embodiment is that stomach-like bulge of the center plate ensures that the support device attached to the moving element has a minimum distance to the vehicle to prevent damage to the vehicle paint, etc. In this embodiment, the moving element is preferably designed as a single part.

Another preferred embodiment provides that the moving element is designed in multiple parts, especially in two parts. In a two-part design, a profile counterpart can be provided for each of the two moving parts in order to be able to engage in each profile of a component of the roof rack. For example, one profile counterpart can engage in the roof guide, and the other profile counterpart can engage in a guide of the support device. The two parts of the moving elements can furthermore be connected to each other in a movable manner. In particular, both parts can be articulated and/or movably connected to each other. This can be advantageous in order to compensate for different angular positions between the individual parts of the roof rack that are connected by means of the moving elements.

In another preferred embodiment, at least one slide is movably mounted on the vehicle pillar guide and/or roof guide, and/or on the support device, wherein the slide can move along the roof pillar guide, and/or along the roof guide, and/or along the support device. In particular, the slide can be movably mounted along tracks provided for one respective component of the roof rack, wherein the slide, similar to the moving element, then preferably has profile counterparts that engage in a profile of the respective tracks and enable moving, or respectively shoving, along the tracks. The slide is furthermore designed to accommodate a moving element such that the moving element can move together with the slide. The moving element can be securely or movably mounted on the support device, the roof guide or the vehicle pillar guide. With this embodiment, it is therefore possible in particular for the moving element to be designed such that it can engage in a specific track of the support device, roof guide or vehicle pillar guide, wherein the tracks are designed to run basically in a straight line. If a change in direction is to occur, a track running perpendicular to this track can be connected in which the slide is arranged. The moving element can then be mounted on the slide or respectively engage in said slide, in particular with its profile counterpart, and then move together with the slide in a different direction. In particular, it is useful for the slide to be designed so that it can optionally hold and release the moving element. A corresponding locking device can be provided on the slide for this. It is advantageous that the moving element must be constructed relatively simply. In particular, it does not have to be adaptable for different types of profiles and/or moving devices of different guides or guide sections. For example, the moving element can move along a guide section for which it is adapted. If the moving device changes to a different guide section, it can be maneuvered on the slide and moved together with the slide into the new moving direction without having to be designed for it.

In another preferred embodiment, a seat opening to receive the moving element is provided in the vehicle body of the vehicle and/or in the roof rack. In particular it can be useful for the moving element to be accommodated in this seat opening when the support device is in the travel position. This is particularly useful because the moving element is not required in the travel position. Only when the support device is to be moved out of the travel position should the moving element be moved out of the seat opening into the roof guide, or another corresponding guide on the support device, and can then serve to move the support device. By providing the seat opening, the moving element visually disappears the travel position so that the integrative overall impression of the roof rack in the motor vehicle is further improved.

Furthermore, it is useful with this embodiment to provide a sealing element to seal the seat opening in the travel position. This sealing element can be a flap, cover, or another closure of the seat opening. The sealing element usefully closes the seat opening watertight so that no rain or splash water can penetrate the seat opening in the travel position and reach the moving element. Furthermore, an actuation device is preferably provided to open and close the sealing means. The opening occurs when the support device is to be moved from the travel position into a loading position or an intermediate position. Conversely, the seat opening is closed with the sealing means when the support device has been moved into the travel position. The actuation means can usefully be controlled by a control device. It is furthermore preferable to provide attachment means on the sealing means in order to attach loading devices, in particular a roof box. The sealing means can thereby fulfill a dual function, namely to seal or respectively close the seat opening and to attach the loading device. For this embodiment, it is useful for the sealing element to move together with the support device since the loading device is generally to be fastened to the support device and moved therewith. Accordingly, the scaling element is therefore affixed on the support device, movably if applicable.

In another preferred embodiment, two profiled support sections are provided on at least one side of the motor vehicle, for example on the B-pillar and on the C-pillar. Furthermore, the two profiled support sections are connected to each other by means of a stabilization profile, wherein the stabilization profile preferably comprises a foldable vehicle roof strip or a support rod. This is in particular useful when the profiled support sections can pivot about a transverse axis relative to its longitudinal axis, for example a profiled support section articulation arranged in the lower area, in order to improve the transverse stability of the profiled support section and hence also the moved support device. The term transverse stability is primarily to be understood as the stability of the profiled support section in the transverse direction relative to its longitudinal axis. Frequently, the transverse direction substantially corresponds with the longitudinal direction of the motor vehicle. The vehicle roof strip can in particular be arranged at the edge of the vehicle roof in the travel position and be incorporated in the integrative overall impression of the vehicle roof. If the profiled support sections are swung away from the vehicle pillar, it is useful for the vehicle strip to also swing away with the stabilization profiles. Likewise, it behaves like a support rod in the design of the stabilization profile, wherein the support rod is arranged in a corresponding recess in the vehicle roof and/or the vehicle body in the travel position. In particular, it is useful for the stabilization profile to connect the two upper areas of the profiled support sections with each other.

If the stabilization profile is designed as a support rod, it is useful for the support rod to have two end areas that in particular extend beyond the two profiled support sections when viewed in the longitudinal direction of the motor vehicle. The two free end areas are then to be connected, in particular movably, to the support device so that the support rod can move at least sectionally relative to the support device. Together, the free end areas of the support rod can engage in a groove or other recess in a support device and be movable along this groove. This embodiment is in particular preferable when the support device is designed as a support frame. The support rod is then in particular movable parallel to the support frame plane parallel to the longitudinal sides of the support frame. This offers the advantage that the upper end areas of the profiled support sections do not contact the outermost point of the support frame but rather the support rod that can be arranged in a position closer to the motor vehicle such as in the middle of the support frame. The pivoting angle of the profiled support sections is thereby reduced which is necessary in order to channel the weight of the support device in the loading position acting substantially vertically downward via the profiled support sections. In particular, the cross-section of the profiled support section that is necessary to channel force can thereby be reduced.

To improve the integrative design, it is furthermore preferable for the vehicle roof of the motor vehicle to have one or more roof recesses to accommodate and guide the support device.

Furthermore, it can be preferable in some embodiments to design the roof rack completely or sectionally transparent. This can in particular be preferable when a sliding roof, etc. is provided in the motor vehicle. Furthermore, color state changing means can be provided to change the state of the color of the roof rack, or at least parts of the roof rack. With the assistance of the color state changing means, the roof rack, or parts of the roof rack, can be changed from the transparent state into a colored state and vice versa. It is in particular useful for the color state changing means to be provided in the roof rack. This can for example be thermal paints or the like.

It is in principle possible for the support device to be manually movable. In another preferred embodiment, a drive is, however, provided to move the support device and, to telescopically move the at least one profiled support section. The drive can furthermore be designed to move, or respectively to displace, other parts of the roof rack if this is necessary for certain embodiments. The drive can be designed in any suitable manner. Preferably, the drive comprises a pneumatic drive, a hydraulic drive, an electric motor, a gravity drive, a winch, and/or a spring force drive. The drive can also comprise different individual drives and combine them with each other if applicable. The drive, or respectively the drives, are installed at a suitable location on the roof rack, or respectively vehicle roof, or also on the vehicle body.

The necessary supply lines (power, compressed air, etc.) can run at least sectionally, or completely, on or in parts, or respectively components of the roof rack. These supply lines can accordingly run for example along the guides, in particular roof guides, vehicle pillar guides, or also guides on support devices, as well as in provided cavities, or respectively holes in these parts. Additional objects provided on the roof rack such as lighting means can be supplied by these supply lines. Furthermore, energy-consuming devices of a loading device arranged on the roof rack, especially a roof box, can also be supplied by these supply lines. For example, these can be lighting means or drives, for example to automatically fold or unfold the roof box. The supply lines can, for example, be coupled to the supply lines of the vehicle doors, the luggage compartment flap, or the rear windshield wiper arranged on the rear window. Alternately, the supply lines can be guided to the engine compartment, for example along the A-pillar of a motor vehicle, and be connected there to the corresponding devices. When coupling to the door supply, chiefly power ill be able to be tapped as in the case of coupling to the rear windshield wiper. In particular in the case of automatically opening closing luggage compartment flaps, hydraulic and/or pneumatic systems are generally provided so that pressure can be run from this area to the roof rack.

In another preferred embodiment of the invention, at least one in particular deformable support body is provided on the vehicle roof and/or on the vehicle body of the motor vehicle. This support body is designed to support the support device, in particular in the loading position or also in another intermediate position, and its supportive effect usefully functions in addition to the profiled support section. Furthermore, a path of movement is provided along the vehicle roof or also on the vehicle body along which the support body can move together with the support device. It is in particular preferable for the support body to be designed integrated in the vehicle roof or a vehicle body, in particular in the travel position, to thereby improve the integrative appearance of the motor vehicle. The support body can in particular contact an area of the support device facing the motor vehicle in the loading position. It is furthermore preferable for the point of contact of the support body on a support device to be at a distance from the point of contact of the profiled support section(s) of the support device so that the force acting on the support device can be evenly diverted, or respectively distributed. The deformable design of the support body is useful because the support is consequently easily capable of following the movement of the support device. Alternately or in addition, it would also be feasible to provide corresponding articulations or other connecting means in the support body that permit a movement of two components relative to each other. If the support body is to be movable on both sides of the motor vehicle, it is correspondingly useful to provide a support body on both sides of the motor vehicle. In this case, it is furthermore useful to design the connection of the support body to the support device to be releasable so that it can be released when the support device is moved to a side of the motor vehicle opposite in the support body. This can in particular be done by providing a catch on the support body and/or on the support, device to releasably connect the support body and support device. This catch can engage in a counterpart in the other connecting partner and be held and also released there. The path of movement can furthermore comprise a corresponding guide, etc. to ensure that the support body can only move along the path of movement. Furthermore, stops, etc. can be provided that limit the path of travel.

In addition, it can be useful to design a support body in multiple parts, wherein the individual parts of the support body are connected to each other, usefully in a movable manner. Alternately or in addition, the support body can be formed from an elastically deformable material in order to allow, in particular, elastic deformation of the support body. Movable connections of the individual parts of the support body can be realized by intermediately arranged deformable material, or corresponding movement-permitting connecting elements such as articulations, etc.

In another preferred embodiment, at least one control device is provided that controls the movement, or respectively the process of movement, of the roof rack. In particular, the control device is designed to control the movement of the support device from the travel position to the loading position and vice versa. To this end, it can be useful for the control device to control a plurality of components, or respectively parts of the roof rack. Furthermore, the control device can be connected to sensors, etc. in order to access the current data regarding the position of the individual parts of the roof rack. Alternately or in addition, predetermined movement patterns etc. can be saved in the control device according to which the individual components of the roof rack are controlled.

It is in particularly useful for the control device to be designed to control the adaptation of the length of the at least one profiled support section, especially when the profiled support section is designed like a telescope. This control usefully depends on the respective position of the support device during the movement process between the travel position and the loading position, or the control device adapts to the length of the at least one profiled support section on the basis of predetermined position parameters as a function of the respective time at which the travel process occurs. For example, be saved it the control device that the moving process will occur over a predetermined period from the travel position to the loading position, and specific individual components positions and, in particular, specific lengths of the profiled support section are saved for each time within this period on the basis of which actuation occurs. If a foldable or otherwise collapsible loading device, in particular a roof box, is to be arranged on the roof rack, the control device can be designed to control the folding process of the loading device.

The object underlying the invention is further achieved by a roof of a motor vehicle, wherein an above-described removable roof rack is arranged on the roof. The roof rack can preferably be arranged integrated in the roof. It is furthermore preferable for the roof to have a roof recess to accommodate the roof rack. The roof recess can usefully be designed such that an upper terminating surface of the roof rack, when in the travel position, terminates flush with the unrecessed part of the roof.

The object underlying the invention is furthermore achieved by means of a motor vehicle that is set up for a movable roof rack designed as described above, and/or has such a movable roof rack.

Examples of preferred embodiments of the invention are described with reference to a drawing, and additional advantageous details of the figures can be found in the drawing. The figures of the drawing schematically show:

DETAILED DESCRIPTION OF THE DRAWINGS

Figure 1:
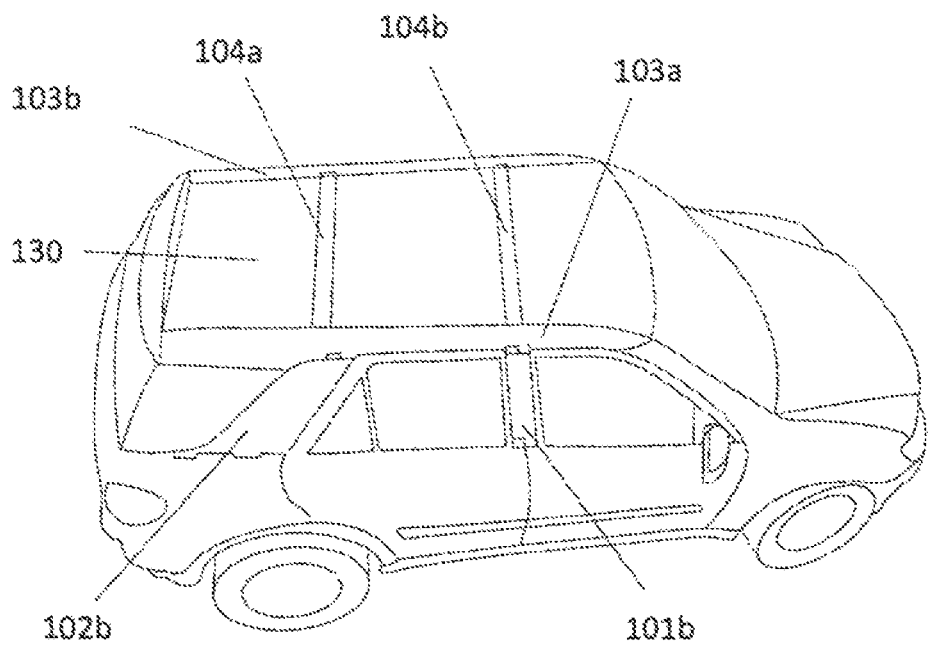
FIG. 1 Perspective view of a motor vehicle with a movable roof rack.

FIG. 1 shows a perspective view of a motor vehicle with movable roof rack. This is in particular suitable for a foldable roof box, but also for any other type of luggage (not shown). A front cross bar 104b and a rear cross bar 104a are provided that form a support device for the roof rack, and are arranged on the vehicle roof 230, and extend from a top area of the left B-pillar 101a up to an upper area of the right B-pillar 101b, or respectively from and upper area of the left C-pillar 102a to an upper area of the right C-pillar 102b. The B-pillars 101a, 101b run aligned substantially vertically, whereas the two C-pillars 102a, 102b run obliquely to the rear viewed from top to bottom. The cross bars 104a have suitable means for affixing luggage or roof boxes (not shown). Two strips 103a, 103b that run lengthwise are arranged at the end areas of the two cross bars 104a, 104b and extend along the longitudinal sides of the roof edges of the roof 130 of the motor vehicle. The cross bars 104a, 104b are in the travel position, and their surfaces terminate approximately flush with the rest of the roof surface of the vehicle roof 130 so that there is an integrative overall impression. The two longitudinal strips 103a, 103b extend in height above the vehicle roof 230, or respectively the cross bars 104a, 104b, just like a transverse guide 180 arranged at the rear roof edge running perpendicular to the longitudinal direction of the motor vehicle. The strips 103a, 103b, 180 frame the roof surface 130 so that, for example, a foldable roof box (not shown) can be arranged thereupon that is connected to the cross bars 104a, 104b in order to move together with the cross bars 104a, 104b. The foldable roof box then forms a flush edge together with the strips 103a, 103b, 180 so that an integrative visual overall impression results.

Figure 2:
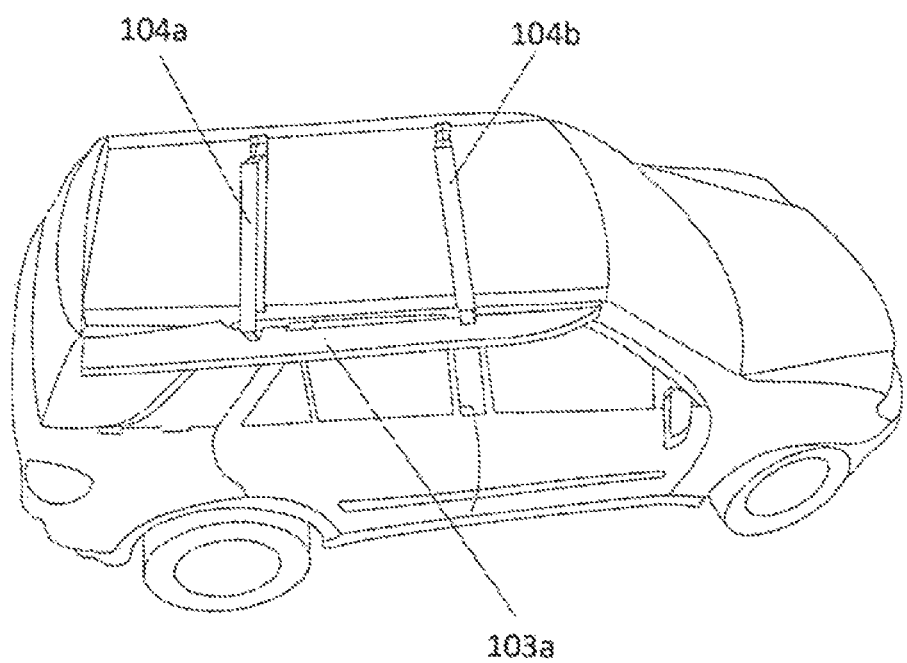
FIG. 2 Perspective view as in FIG. 1, but with partially horizontally extended cross bars.

FIG. 2 shows a perspective view as in FIG. 1, but with partially horizontally extended cross bars 104a, 104b, i.e., the moving process of the support device from the travel position to the loading position has started, or respectively is underway. The extension serves to first move luggage or a roof box fastened to the cross bars 104a, 104b horizontally in a lateral direction. During the extension, the strip 103a facing the direction of extension folds out approximately 90 degrees to the outside.

Figure 3:
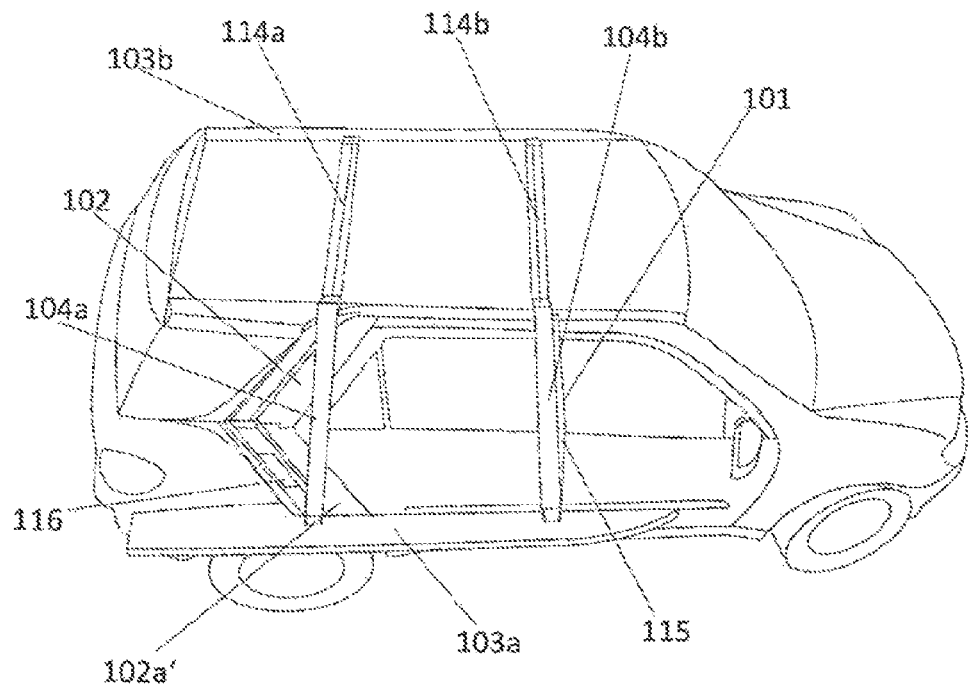
FIG. 3 Perspective view as in FIG. 1, but with completely horizontally extended cross bars.

FIG. 3 shows a perspective view as in FIG. 1, but with completely horizontally extended, or respectively laterally shifted, cross bars 104a, 104b. When extending, the cross bars 104a, 104b move along the provided, approximately U-shaped recesses that are designed as roof guides 114a, 114b. When extending, the cross bars 104a, 104b are held at one end area by the roof guides 114a, 114b and at the other end area by profiled support sections 115, 116. At their bottom end, the profiled support sections 115, 116 are articulated by their one, bottom section to the pillars 101, 102, and at the other top end, are articulated to the cross bars 104. The profiled support sections 115 of the B-pillar 101, and the supports profiles 116 of the C-pillar 102, are releasably connected by articulations to the strip 103a. When moving down, this strip 103 folds outward and moves outward together with the cross bars 104a, 104b, or respectively with the upper areas of the profiled support sections 115, 116. Since the C-pillar 102 runs obliquely, the connection between the upper area of the profiled support section 116 and outer section of the cross bars 104a is designed mirrored so that the different angular positions of the B-pillar 101 and the C-pillar 102 can be compensated during the moving process, or respectively while the profiled support sections 115, 116 are pivoting.

Figure 4:
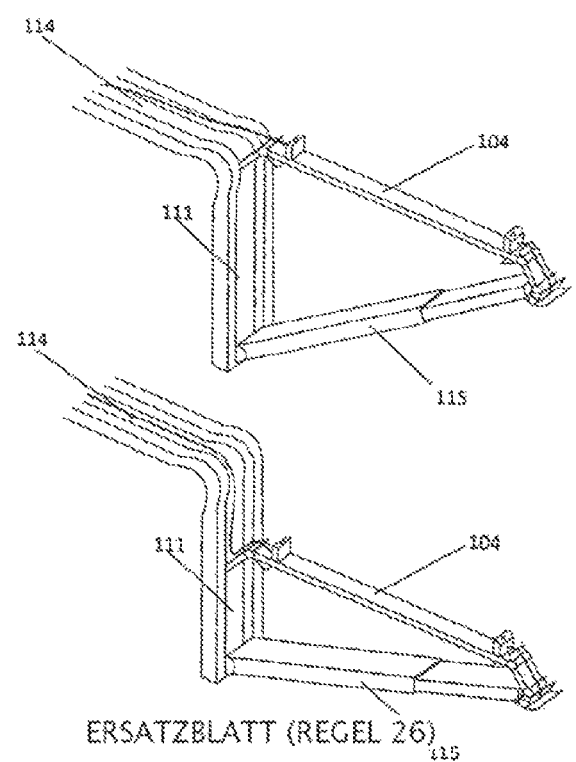
FIG. 4 Two perspective detailed views of one completely horizontally extended cross bar, and one partially vertically lowered cross bar.

FIG. 4 shows an upper, perspective detailed view of a cross bar 104 that is extended completely horizontally 30. Underneath, the cross bar 104 is depicted in a partially vertically lowered position. As described above, the cross bars 104 first travel horizontally along their roof guides 114 to the side. During this, the profiled support sections 115, 116 fold away from the pillars 101, 102. The profiled support sections 115, 116 are designed to be telescopically adaptable in length, in particular as dual telescopic arms, and are therefore to be adapted to lengthen to the length of the cross bars 104 when folding out.

Figure 10:
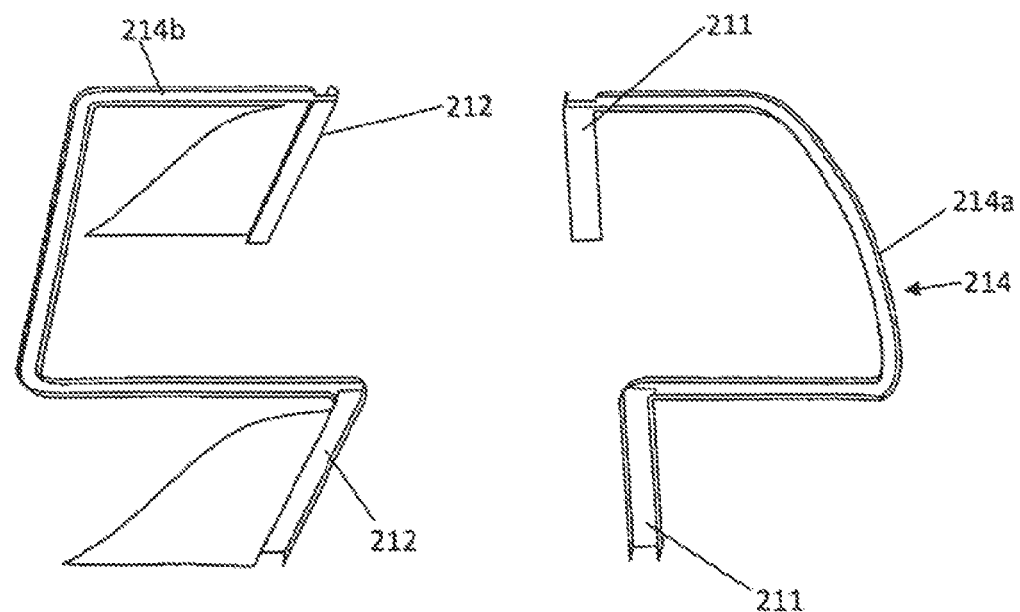
FIG. 10 View of parts of the roof rack from FIG. 9 without motor vehicle and without a support device.

The horizontal roof guides 114 transition into pillar guides 111, 112 that run approximately vertically and are arranged on the outside of the pillars 101, 102. FIG. 10 shows an example of the B-pillar 111. The cross bars 104 first travel horizontally from the roof guides 114 into the pillar guides 111, 112, and thereby move vertically downward together with the strips 103. The cross bars 104 can be moved to the right or left, whereby the roof rack can be lowered vertically and loaded or unloaded optionally on one or the other side of the motor vehicle. A particularly comfortable roof rack is thereby provided that conveys luggage from the vehicle roof 230 downward on the side of the vehicle. After loading or unloading in the loading position of the support device, the process can proceed in the reverse direction, and luggage can be conveyed onto the vehicle roof 230. In a simple embodiment, the described transportation process can occur manually and, for example, be supported by springs as with a tailgate. In a more complex embodiment, the described transportation process occurs automatically by means of an electrical, pneumatic and/or hydraulic drive and controls. To prevent the profiled support sections 115, 116 and the cross bars 104 from contacting other vehicles or walls when unfolding or respectively extending, distance sensors can be provided on the motor vehicle that are connected to controls and stop or retract the drive.

Figure 5:
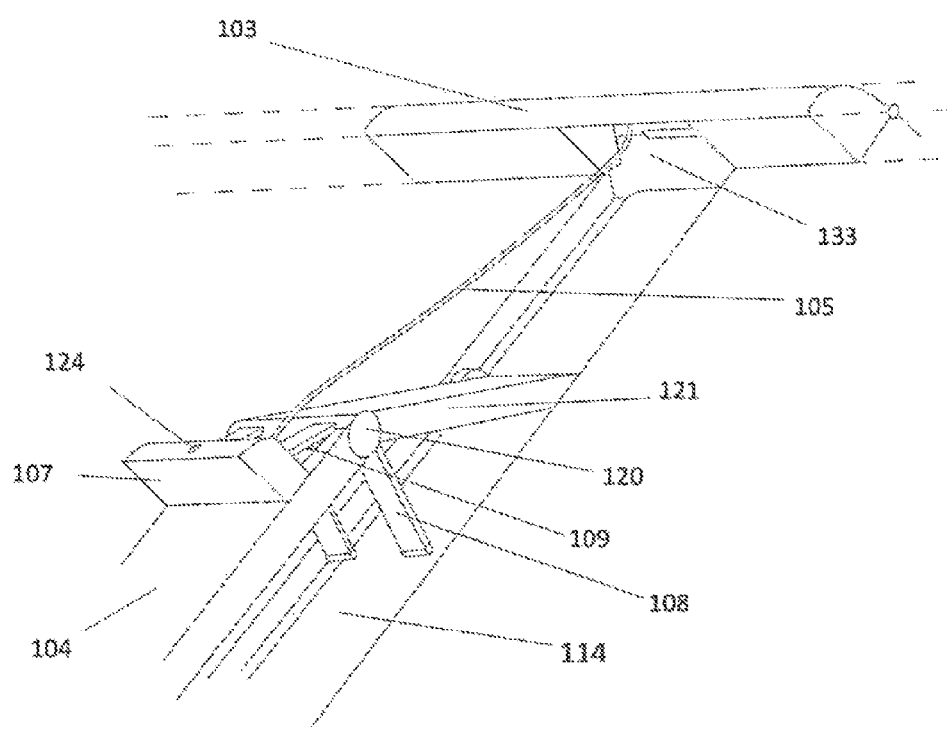
FIG. 5 Perspective detailed view of a partially horizontally extended cross bar.

FIG. 5 shows a perspective detailed view of the partially horizontally extended cross bars 104 as in FIG. 2. A moving element designed as a foot 121 is arranged at the end area of the cross bars 104. The foot 121 can slide in the roof guide 114 or move by means of the wheels or rollers (not shown). When the cross bars 104 are in an extended position as shown in FIG. 1, the foot 121 is lowered into a seat-opening 133 of the strip 103. In this position, the bottom side of the cross bars 104 lies on the surface of the roof guide 114, and the bar opening 133 is closed by a sealing element designed as a retaining element 107. This has seals (not shown) for this purpose. Since the foot 121 is angled in relationship to the cross bars 104, the cross bars 104 are lifted when extending as shown in FIG. 5. Due to the lifting, an angled element 108 swings downward by means of a pretensioned spring 109 and presses the retaining element 107 in the direction of extension. The retaining element 107 has an opening 124 for fastening a roof box or luggage (not shown).

When moving, the cross bars 104 are driven, or respectively pulled, by two cables 105 for each direction, of which only one is shown. The cable 105 is guided through the strip opening 133. The cable 105 can be designed as a pneumatic or hydraulic hose for supplying energy to the roof rack drive. Alternately or in addition, a power line can be accommodated in the cable 105 that supplies the drive, lighting means, etc. with power. The cross bars 104 can also move in the other direction and be lowered vertically on the other side of the motor vehicle. It is thereby possible to load and unload on each side, for example when only one side is accessible.

Figure 6:
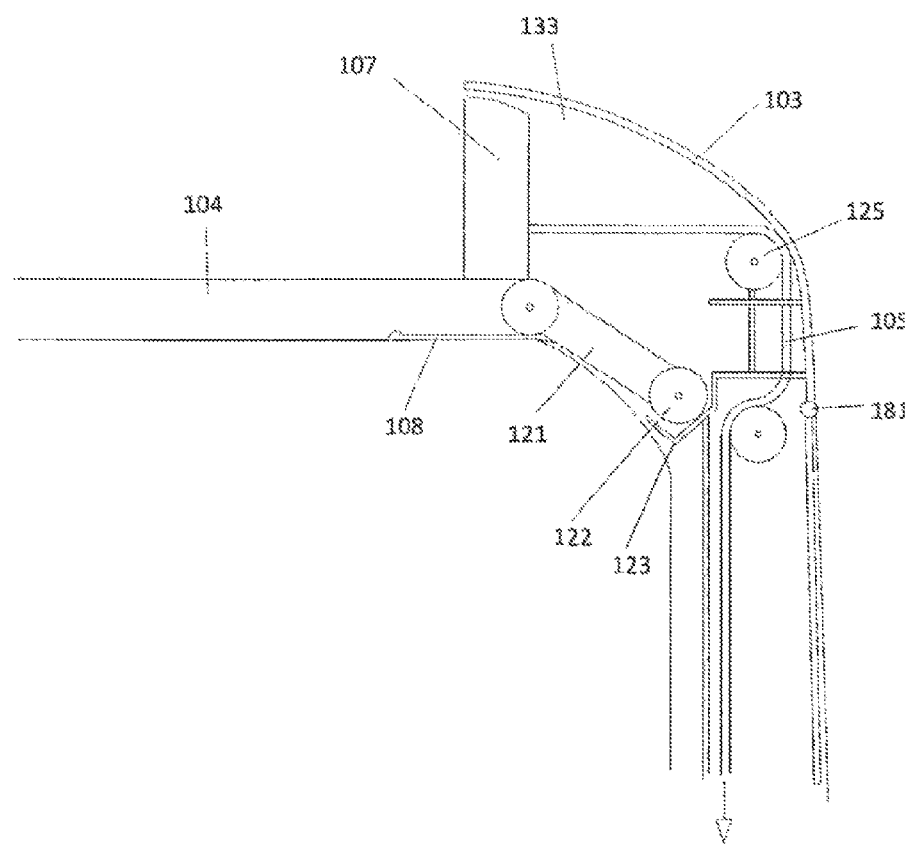
FIG. 6 Side view of a cross bar with a foot element in the travel position.
Figure 7:
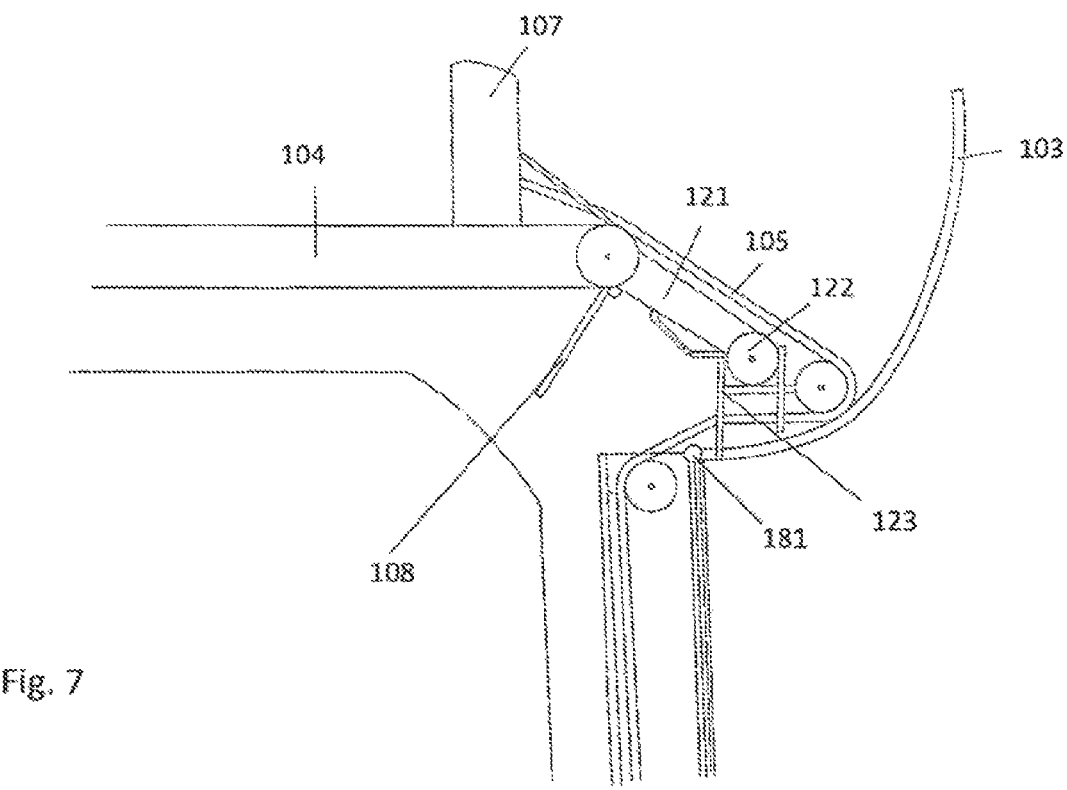
FIG. 7 Figure from FIG. 6, wherein the cross bar has moved out of the travel position.

FIG. 6 shows a side view of a section of a cross bar 104 with a moving element 160 in a travel position designed as a foot element 121. The cross bars 104 with the foot element 121 is designed similar to the cross bar from FIG. 5. It can be discerned that the retaining element 107 covers and seals the seat opening 133. The foot element 121 is arranged in the seat opening 133 and abuts the vehicle roof 230, or respectively the body, at least in sections. Wheels 122 are provided on the free end of the foot element 121. These wheels 122 lie on a retaining plate 123 that in turn has a deflection roller 125 about which a cable 105 is guided. The cable 105 is connected to the retaining element 107. When the cable 105 is pulled downward, the wheels 122 of the foot element 121 press against the retaining plate 123. The retaining plate 123 is securely connected to the inside of the bar 103 with which the seat opening 133 is provided. When the wheels 122 press against the retaining plate 123, the strip 103 is swung outward about a strip articulation 181 (FIG. 7). This singing movement can, if applicable, be supported by small motors, etc. in the strip articulation 181. Furthermore, the cross bar 104 is thereby lifted off the vehicle roof 230 (as shown in FIG. 7). In the travel position shown in FIG. 6, the cross bar 104 still lies on the vehicle roof 230.

Figure 8:
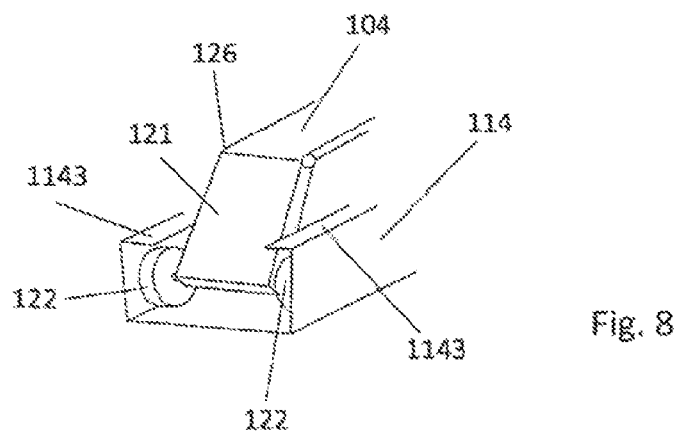
FIG. 8 Front view of the foot element of the cross bar.

FIG. 8 shows a front view of the cross bar 104 with a foot element 121 arranged thereupon. The cross bar 104 is in a lifted state. It is discernible that the foot element 121 is also designed as a short strip element which is connected to the cross bar 104 by means of foot element articulations 126. A wheel 122 is arranged on each side of the free end of the foot element 121. The wheels 122 engage in a roof guide 114 that is designed as a C-profile open to the top. The wheels 122 are enclosed by the floor of the roof guide 114 as well as the two short C-legs 1143 so that the foot element 121 cannot be moved upward out of the roof guide 114 but can only be moved along the roof guide 114.

Figure 9:
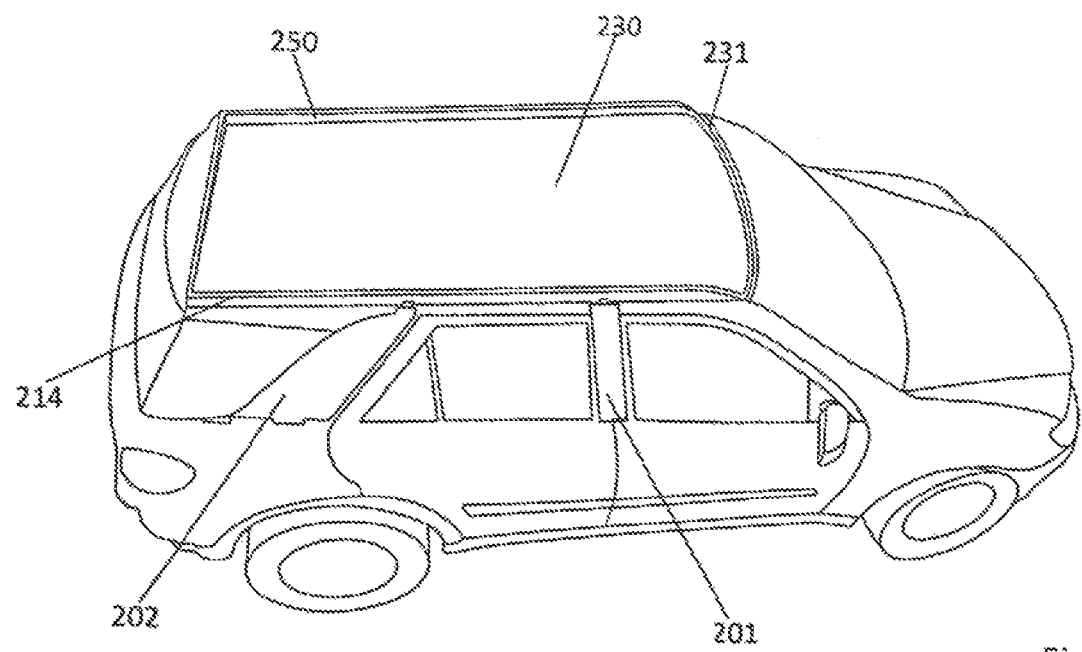
FIG. 9 Perspective view of a vehicle roof with an additional embodiment of a movable roof rack in the travel position.

FIG. 9 shows a perspective view of a motor vehicle with an additional embodiment of a movable roof rack. The motor vehicle is a typical motor vehicle with a front B-pillar 201, a rear C-pillar 202, and a vehicle roof 230.

A support device designed as an approximately rectangular support frame 250 is provided for the roof rack and is movably attached to the vehicle roof 230, and has suitable means for attaching luggage or roof boxes. FIG. 9 shows the support frame 250 in the travel position. In this position, it terminates flush with the roof surface. The support frame 250 is mounted in form-fit recesses (not shown) in the vehicle roof 230. It is integrated in the vehicle roof 230 and is visually inconspicuous. The support frame 250 is designed to be horizontally and vertically movable for loading or unloading.

Guides 214, 211, 212 shown in Fig. are provided for this. These are depicted without a motor vehicle for reasons of clarity. The guides 214, 211, 212 can, for example, be designed as recesses in the roof 230, or respectively in the pillars 201, 202. A front 214a and a rear roof guide 214b are provided as horizontal roof guides 214 which run approximately along the roof edge 231. The two ends of the front roof guide 214a transition into the downwardly angled B-pillar guides 211, and the two ends of the rear roof guide 214b transition into the angled C-pillar guides 212 that extend approximately vertically along the B-pillars 201 or respectively obliquely to the rear, when viewed from top to bottom, along the C-pillars 202.

Figure 11:
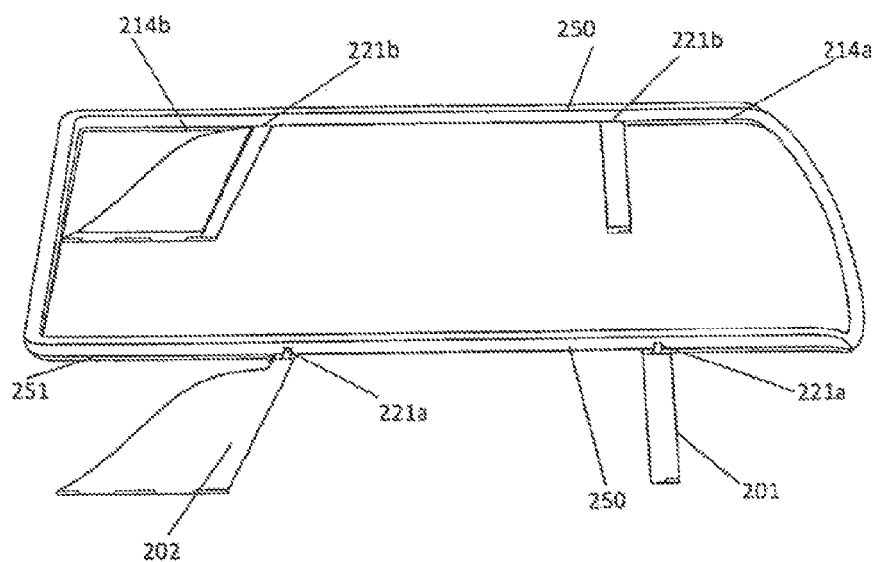
FIG. 11 View of the roof rack from FIG. 10 with support device.

FIG. 11 shows the guides 214, 211, 212 shown in FIG. 2. In addition, the movable support frame 250 is depicted above the guides 214, 211, 212. On its bottom side, the support frame 250 has frame guides 251 that can be designed as recesses or as tracks, or as tracks within recesses. In addition, four moving elements are provided as foot elements 221 that on the one hand are movably arranged on the roof guides 214 and the pillar guides for 211, 212 and, on the other hand, on the frame guides 251. The support frame 250 is thereby movably connected by the foot elements 221 to the roof 230. In the travel position as in FIG. 9, the four foot elements 221 are each positioned in the area of the B-pillars 201, and in the area of the C-pillars 202 as shown in FIG. 11.

To move the support frame 250, it is first lifted slightly by moving the foot elements 221 upward that bear the support frame 250. FIG. 11 shows the support frame 250 in this slightly lifted position.

After lifting, the two foot elements 221a are locked on the right side of the vehicle, or the two foot elements 221b are locked on the left side of the vehicle. The process is shown for the case in which the two foot elements 221a are locked on the right side. Locking is to be understood as meaning that the foot elements 221 are connected to profiled support sections 215, 216 by means of seat devices (see FIG. 12). The left foot element 221b of the front roof guide 214a then moves forward, and the left foot element 221b of the rear roof guide 214b moves to the rear approximately in the direction of the longitudinal axis of the motor vehicle along the sections of the roof guide arranged in the area of the roof edge 231. Then the foot elements 221b follow the curvatures of the roof guides 214a, 214b and move along the roof guides 214a, 214b approximately horizontal and orthogonal to the longitudinal axis of the vehicle. The foot elements 221 can for example be moved by cables or servomotors.

Figure 12:
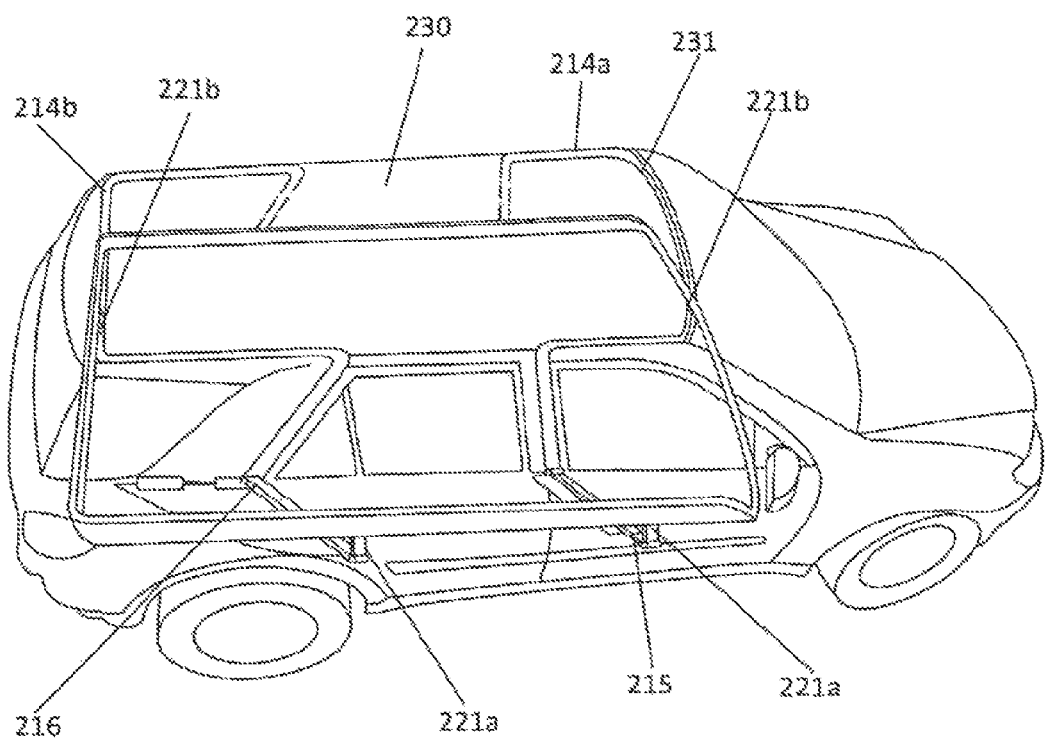
FIG. 12 View of the roof rack from FIG. 9 in an intermediate position.

Once the foot elements 221b reach approximately the middle of the orthogonal section of the roof guides 214a, 214b, the entire support frame 250 moves to the right with reference to the vehicle. This is shown in FIG. 12. The movement occurs because the profiled support sections 215, 216 are articulated at their bottom section by their bottom area to the pillars 201, 202. The two profiled support sections 215, 216 are also articulated at their top areas to the two lockable foot elements 221a. The two profiled support sections 215, 216 fold away from the pillars 201, 202. By locking the foot elements 221a on the profiled support sections 215, 216, the support frame 250 is first pulled horizontally to the right until it reaches the right roof edge 231.

Figure 13:
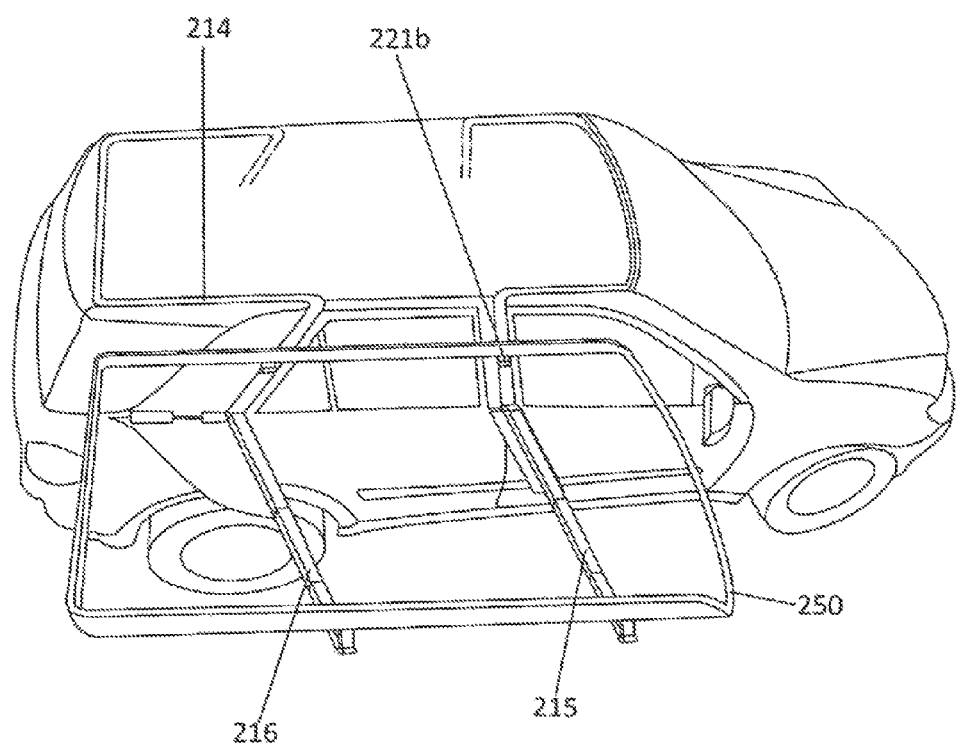
FIG. 13 View of the roof rack from FIG. 9 in the loading position.
Figure 14:
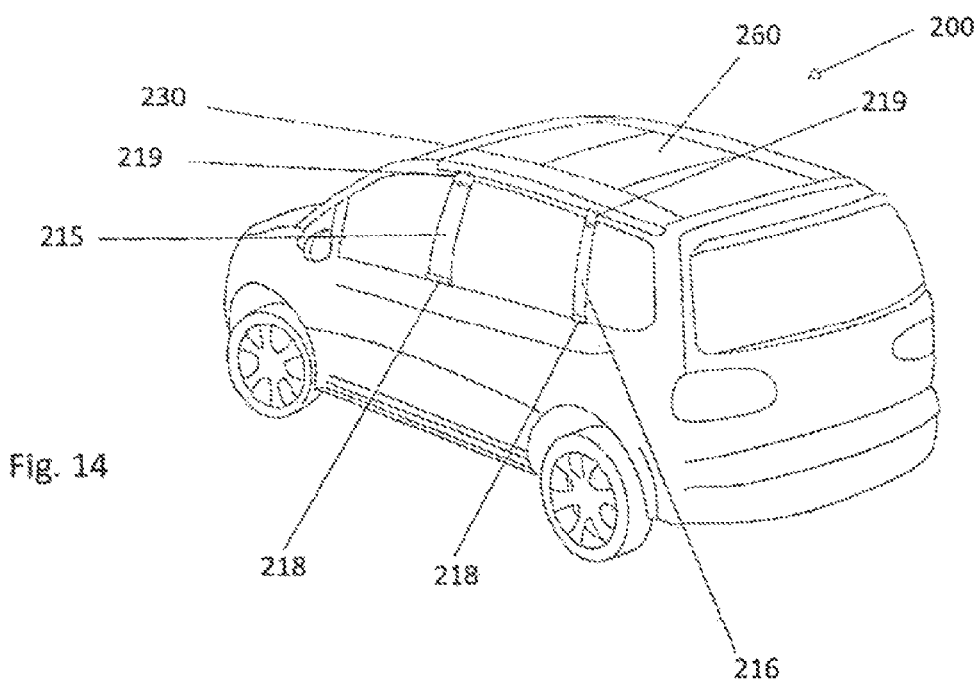
FIG. 14 Perspective view of a vehicle roof with an additional embodiment of a movable roof rack with a foldable roof box in the travel position.
Figure 15:
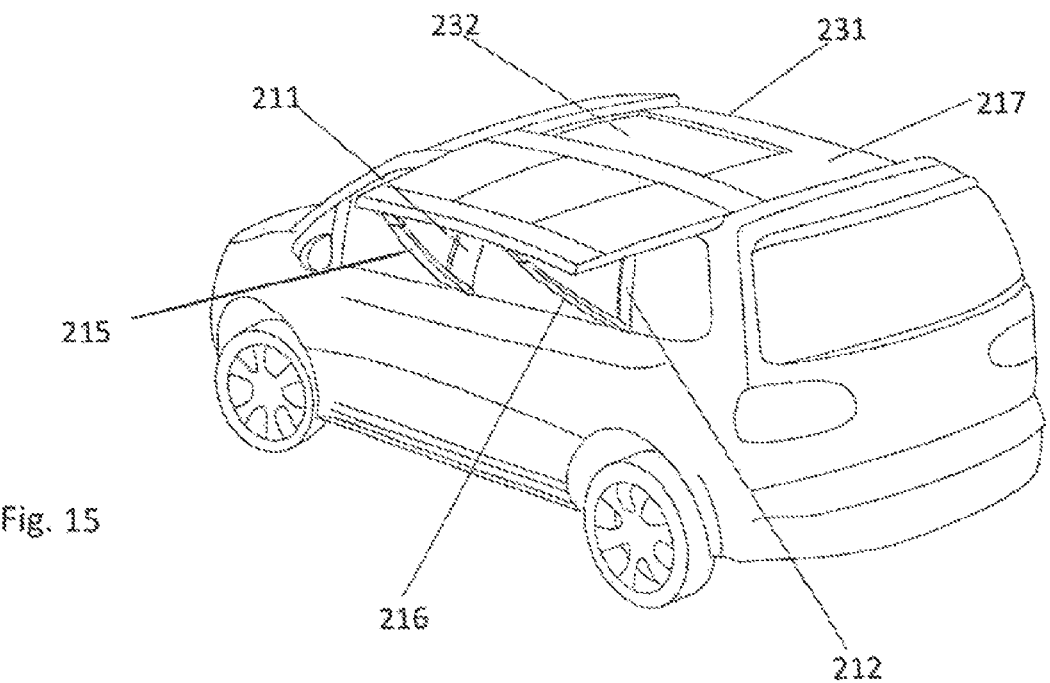
FIG. 15 View of the roof rack from FIG. 14 in an intermediate position.
Figure 16A:
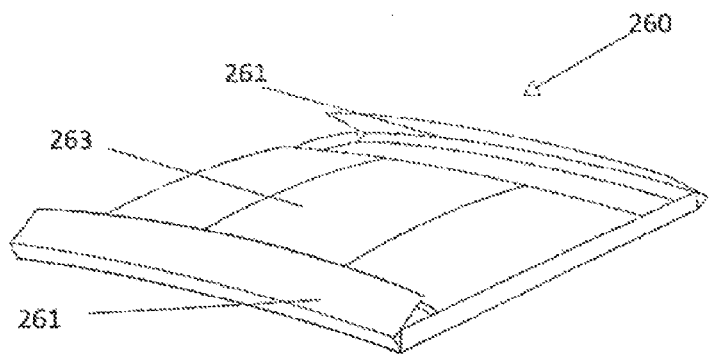
FIG. 16a to 16c Views of the roof box from FIGS. 14 and 15 in different folded states.
Figure 16B:
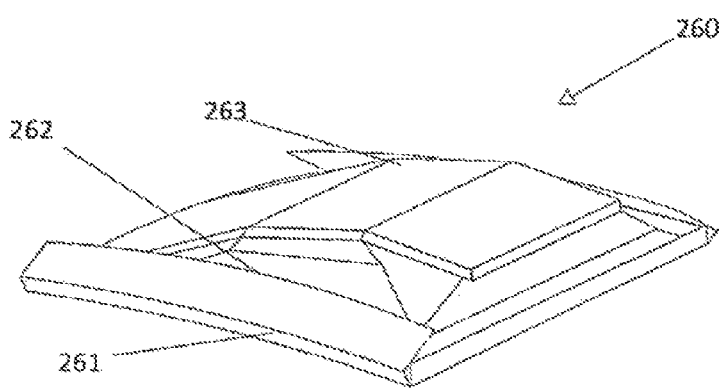
Figure 16C:
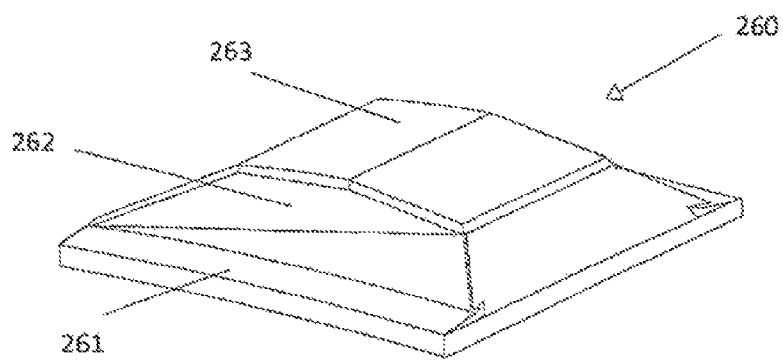

FIG. 13 shows that the two foot elements 221b have then again moved along the roof guides 214 in the longitudinal direction of the vehicle toward the columns 201, 202. Following these movements in the horizontal plane, the foot elements 221b move along the two pillar guides 211, 212 either vertically, or respectively obliquely downward in the case of the C-pillar. At the same time, the profiled support sections 215, 216 continue to unfold. Since they are designed to be telescopically adaptable in length, they become longer while unfolding. Overall, the support frame 250 thus moves vertically downward until it reaches the loading position.

The support frame 250 hence first moves substantially in a horizontal direction across the roof 230 of the vehicle, and then lowers in a substantially vertical direction on one side. Luggage, for example, can be fastened to the support frame 250, or a supportable roof box can be mounted. The support frame 250 can be moved to the right or left, whereby the roof rack can be lowered vertically and loaded or unloaded optionally on one or the other side of the motor vehicle. A particularly comfortable luggage rack is thereby provided that conveys luggage from the vehicle roof 230 downward on the side of the vehicle. After loading or unloading, the process can proceed in the reverse direction, and luggage can be conveyed onto the vehicle roof 230.

Figure 17:
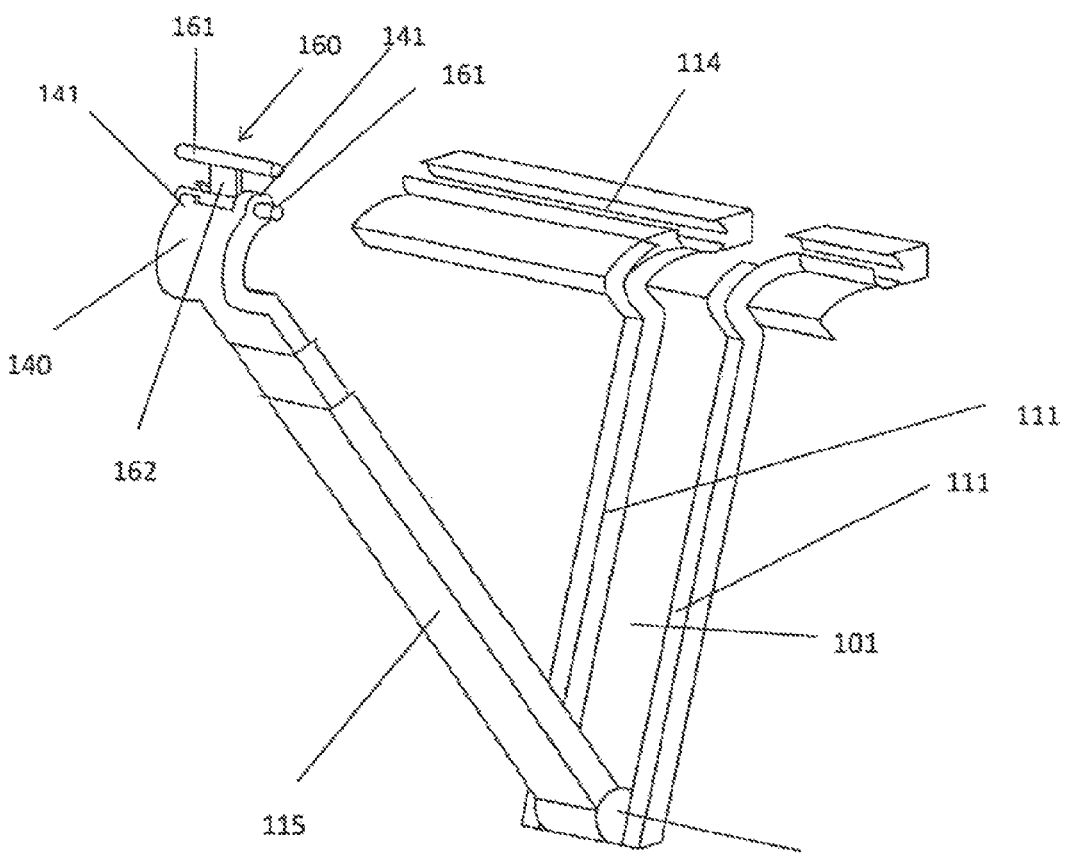
FIG. 17 Perspective view of a profiled support section swung away from the vehicle with a seat device and moving element.

FIG. 17 shows a perspective side view of a profiled support section 115 that has pivoted on the profiled support section articulation 218 arranged on the bottom end of the profiled support section 115 and away from the vehicle pillar 101. The profiled support section 115 is designed as a triple telescopic arm. A vehicle pillar guide 111 is provided on the vehicle pillar 101 and comprises a left and right track. When the profiled support section 115 is in the state of being pivoted onto the vehicle pillar 101 (not shown), the two side tracks of the vehicle pillar guide 111 lie on the profiled support section 115 on the left and right. A perpendicular roof guide 114 adjoins above the vehicle pillar guide 111. Both the vehicle pillar guide 111 as well as the roof guide 114 have a profile. At the free end of the profiled support section 115, there is a seat device 140 that is designed to accommodate a moving element 160. The moving element 160 has two transverse bars 161 which are aligned parallel to each other and are arranged at a distance from each other, and are connected to each other by means of a middle bar 162. The transverse bars 161 can each engage in corresponding profiles, in particular in semicircular profiles. For example, the depicted roof guide 114 is designed as such a corresponding profile. The seat device 140 has seat eyelets 141 in which the lower transverse bar 161 can engage. In particular, the two eyelets 141 are at a distance from each other, or respectively are adjusted to the width of the middle bar 162 so that the moving element 160 is mounted with play in the seat device 140 in a perpendicular direction relative to the profiled support section 115. The left eyelet 141 can be opened and closed so that the moving element 160 can be retained, or respectively released in the seat device 140.

Figure 18:
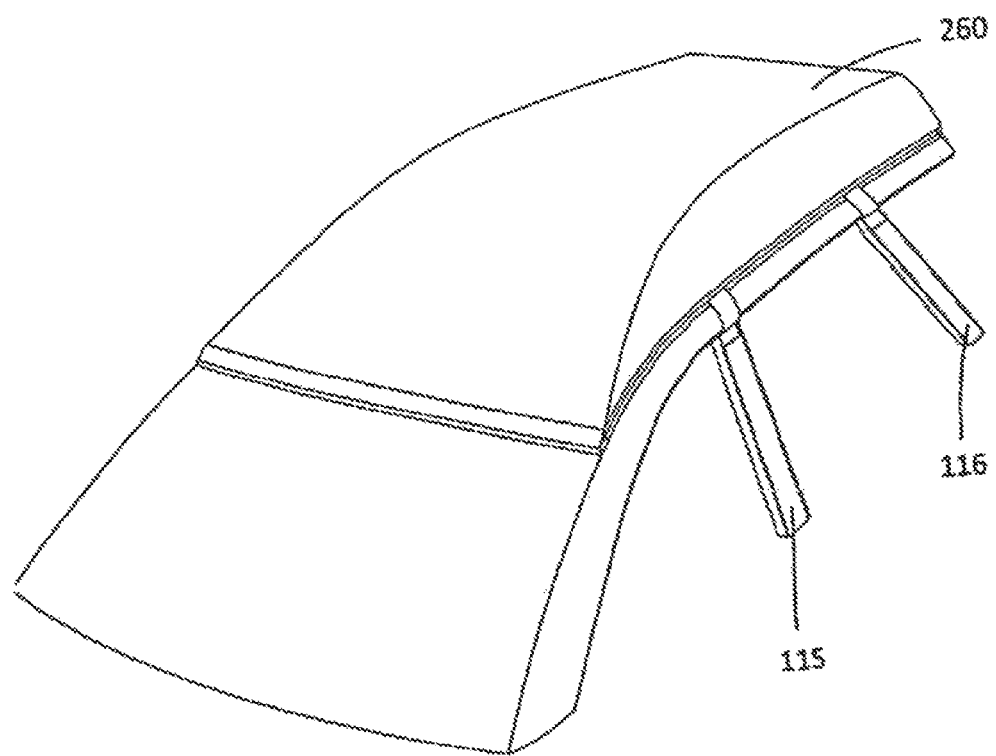
FIG. 18 Perspective view of another embodiment of the roof box with a roof box arranged thereupon.
Figure 19:
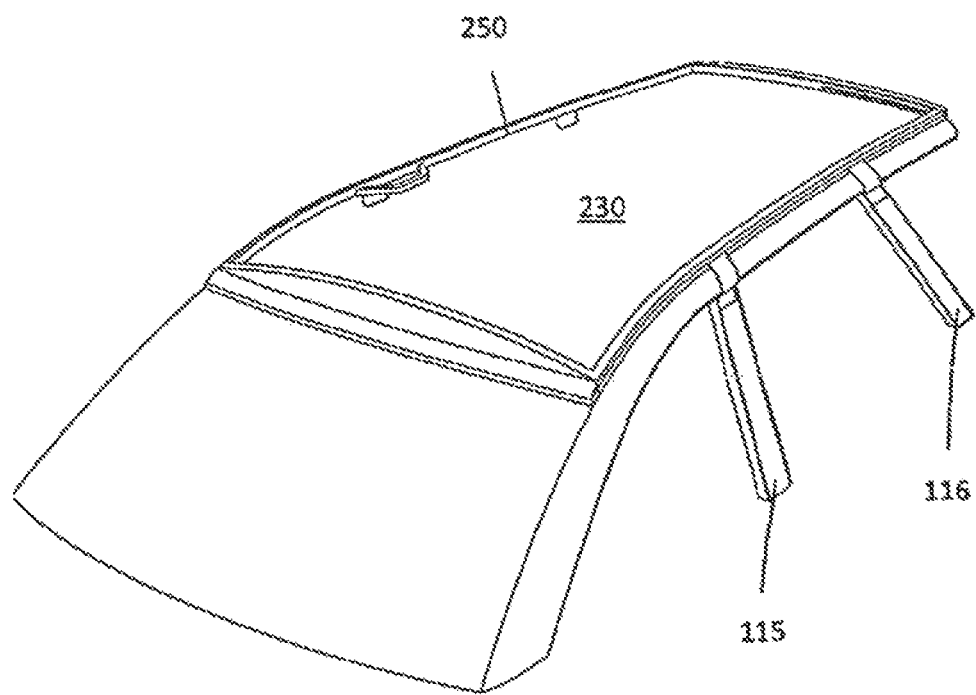
FIG. 19 View from FIG. 18 without a roof box.
Figure 20:
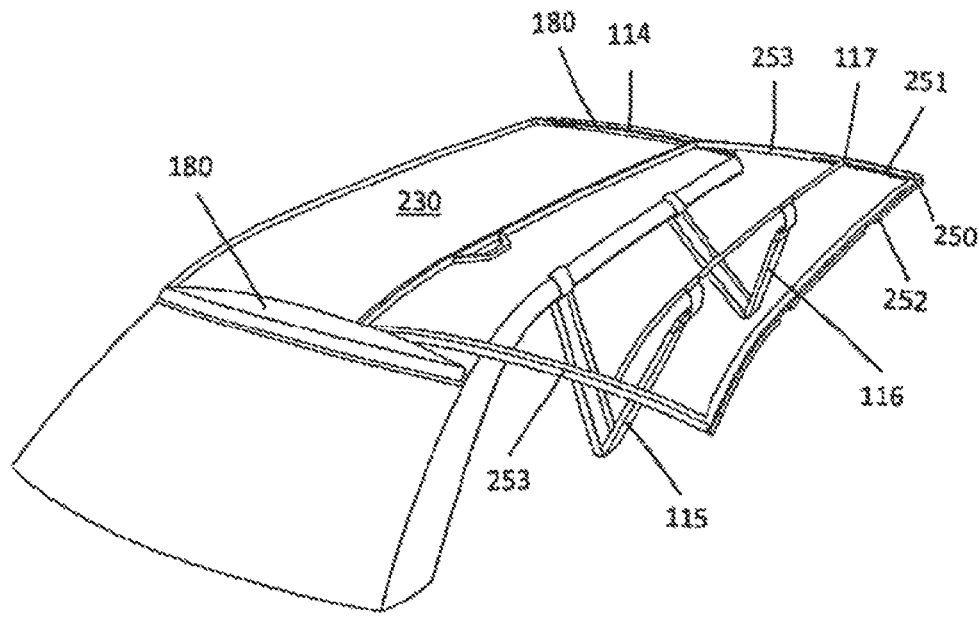
FIG. 20 View from FIG. 19 in an intermediate position.
Figure 21:
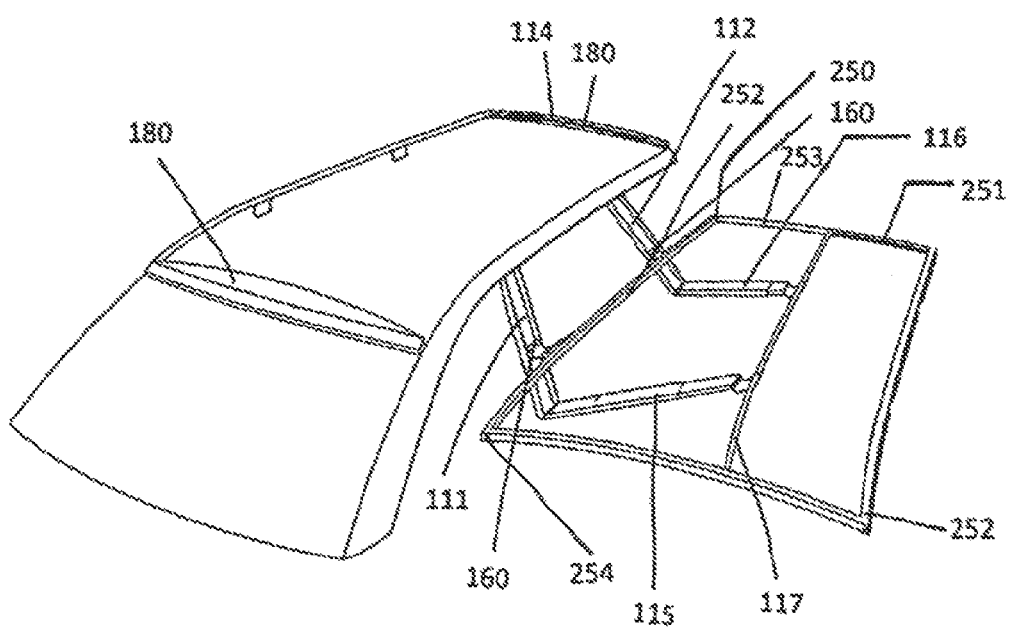
FIG. 21 View from FIG. 19 in a loading position.
Figure 22:
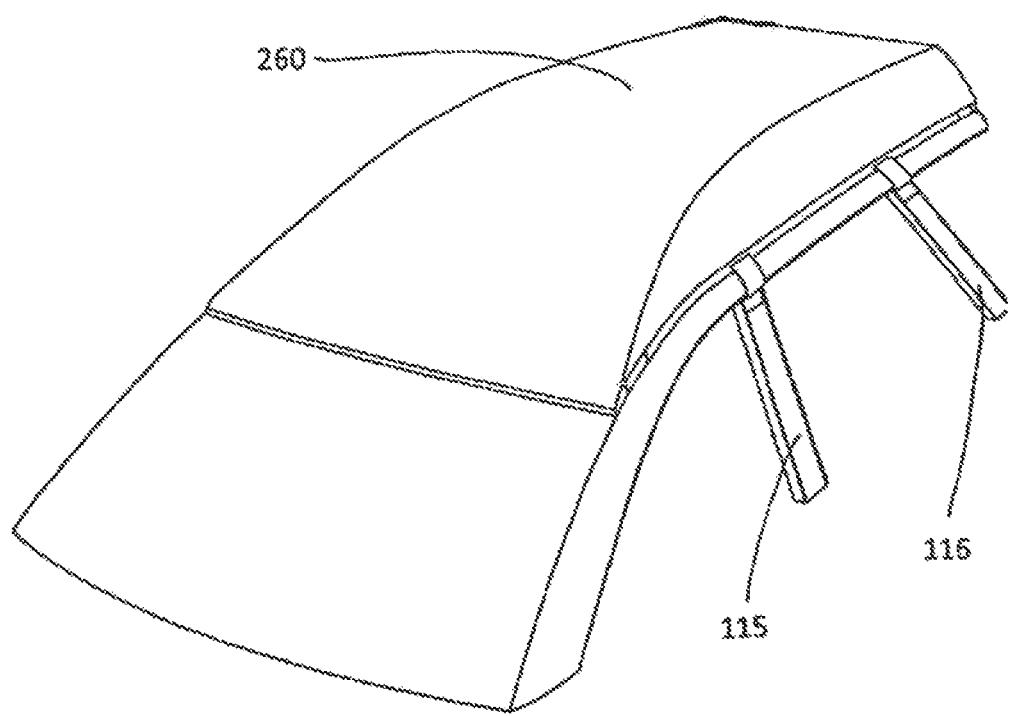
FIG. 22 Perspective view of another embodiment of the roof box with a roof box arranged thereupon.
Figure 23:
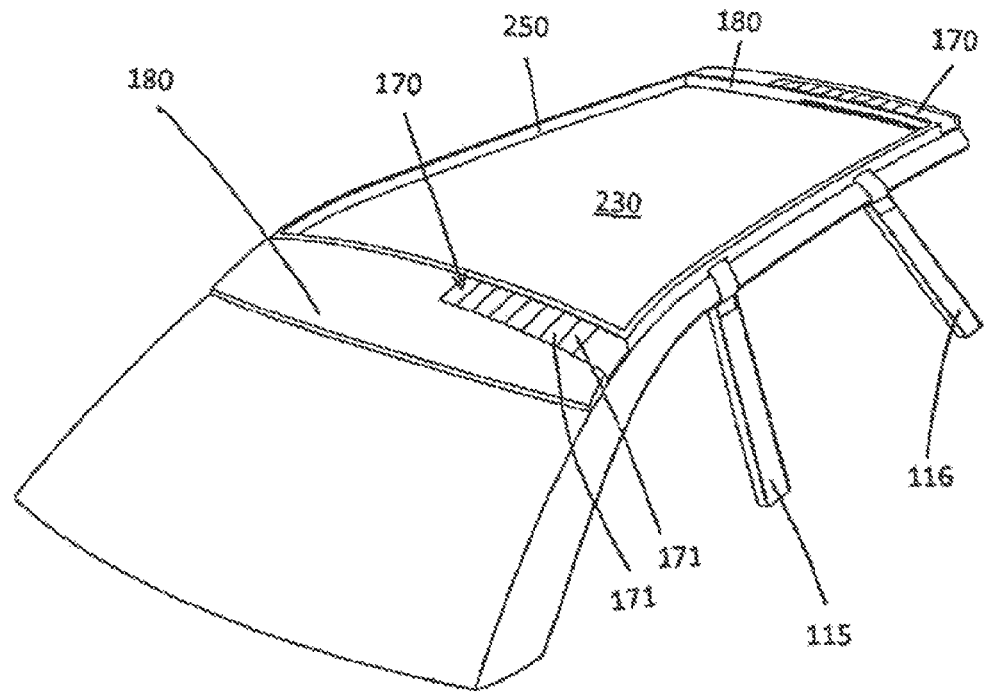
FIG. 23 View from FIG. 22 without a roof box.
Figure 24:
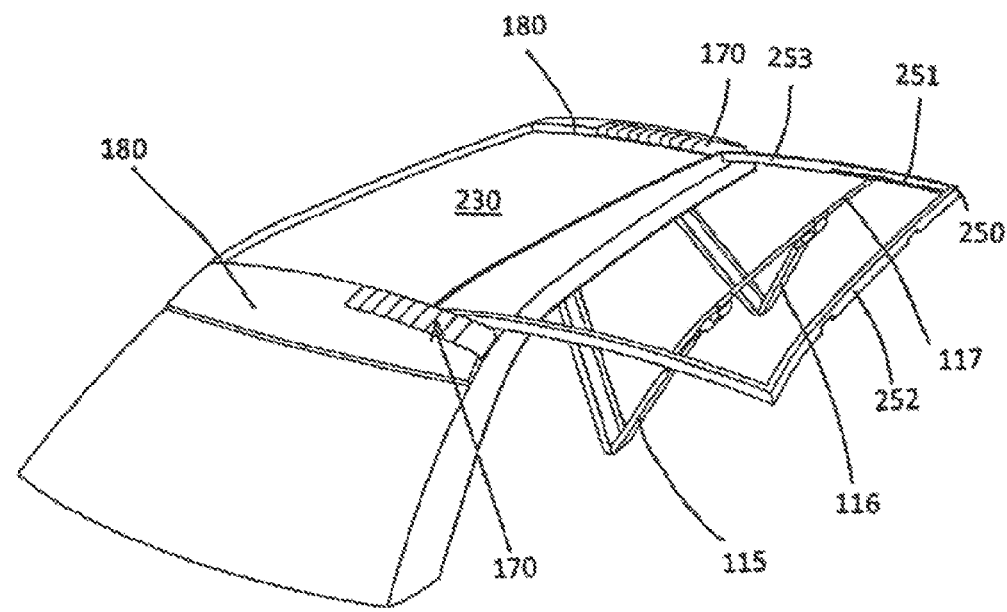
FIG. 24 View from FIG. 23 in an intermediate position.
Figure 25:
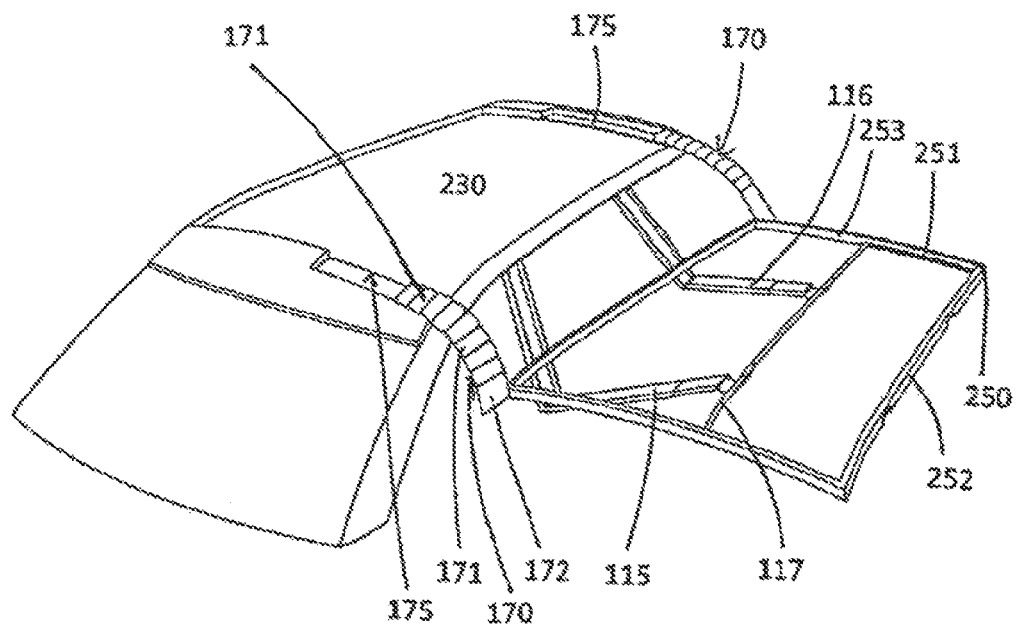
FIG. 25 View from FIG. 23 in a loading position.

FIG. 18 to 21 show another embodiment of the roof rack. The roof rack has a support device designed as a support frame 250. A roof box 260 that can be folded and unfolded is securely attached to this support frame 250 (C. FIG. 18). In FIG. 19 to 21, the roof box 260 is omitted for the sake of clarity. The roof box 260 is moved together with the support frame 250. The free ends of the profiled support section 115, 116 are connected to each other with a stabilization profile designed as a support rod 117. In the travel position shown in FIGS. 18 and 19, the profiled support sections 115, 116 are in the unpivoted state, and the support rod 117 is arranged in a groove or respectively recess provided therefor (not shown) in the right longitudinal side rail 252 of the support frame 250. On the inside of the transverse side rail 253 of the support frame 250, a frame guide 251 designed as a groove is provided that, from the end of the transverse side rail 253 on the end adjoining the longitudinal side rail 252, extends approximately to the middle of the transverse side rail 253. At both sides, the support rods 117 extends beyond their connecting points to the free ends of the profiled support sections 115, 116 and each engage with their free sections in a frame guide 251 of a transverse side rail 253 of the support frame 250 (see FIGS. 20 and 21). In the moving process from the travel position (depicted in FIGS. 18 and 19) to the loading position (depicted in FIG. 21), the support frame 250 is first shifted approximately horizontally to the right side of the roof rack. During the lateral shifting process, the support rod 117 travels in the flame guide 251 from the end of the flame guide 251 facing the right longitudinal side rail 252 up to the opposite end of the frame guide 251 that is arranged approximately in the middle of the transverse side rail 253. When the support rod 117 arrives at this end position, the support frame 250 is moved laterally beyond the vehicle roof 230 and can be lowered. To this end, moving elements 160 move downward in a pillar guide 111, 112. The moving elements 160 are furthermore connected to the left longitudinal side rail 252 of the support frame 250. The advantage of this embodiment with the movable support rod 117 is that the force introduction point of the weight of the support frame 250, or respectively the roof box 260 arranged thereupon, in the loading position for the profiled support sections 115, 116 does not lie in the area of the right longitudinal side rail 252, but rather approximately in the middle of the support frame 250. This makes it possible to dimension the profiled support sections 115, 116 smaller. The support frame 250 is furthermore movable on the vehicle roof 230 by means of roof guides 114. The roof guides 114 are arranged on the inside of an upwardly projecting transverse guide 180 arranged on both a front rear side of the vehicle roof 230. A pin 254 arranged on the outside of each transverse side rail 253 of the support frame 250 engages in these roof guides 114 designed as grooves.

FIG. 22 to 25 depict another embodiment of the movable roof rack that is designed similar to those from FIG. 18 to 21. In contrast to the above-described roof rack, the roof rack depicted in FIG. 22 to 25 has additional support bodies 170. The support bodies 170 consist of a plurality of individual pieces 171 having a rectangular outline and are each flexibly connected, i.e., in particular pivotable relative to each other, to a neighboring individual piece 171 and form a type of strip. In a travel position (depicted in FIGS. 22 and 23), the support body 170 is completely arranged in a recess 175 provided for that purpose in the transverse guides 180.

The recess 175 is designed as a path of movement along which the support bodies 170 can move perpendicular to the longitudinal direction of the motor vehicle. In the travel position, one end of the support body 170 lies approximately flush against the side edge of the roof 230 so that the support body 170 can be moved outward beyond the vehicle roof 230. The outer end 172 of the support body 170 has a stop (not shown) for a catch (not shown) on the support frame 250. A reversed arrangement of the stop and catch is also conceivable. The catch is arranged on the outside of each side rail 253 so that the support body 170, once the catch has reached the stop, moves out of the recess 175 together with the support frame 250. Since the single individual pieces 171 are flexibly connected to each other, the support body 170 can curve downward, or respectively bend, when emerging from the recess 175 and follow the movement, or respectively lowering movement of the support frame 250. In particular in the loading position shown in FIG. 25, it is advantageous that this provides additional support of the support frame 250, and the weight of the support frame 250 and the roof box 260 located thereupon does not have to be borne exclusively by the profiled support sections 115, 116. The individual pieces 171 can alternately or in addition be produced from a flexible material to generate additional flexibility.

Figure 26:
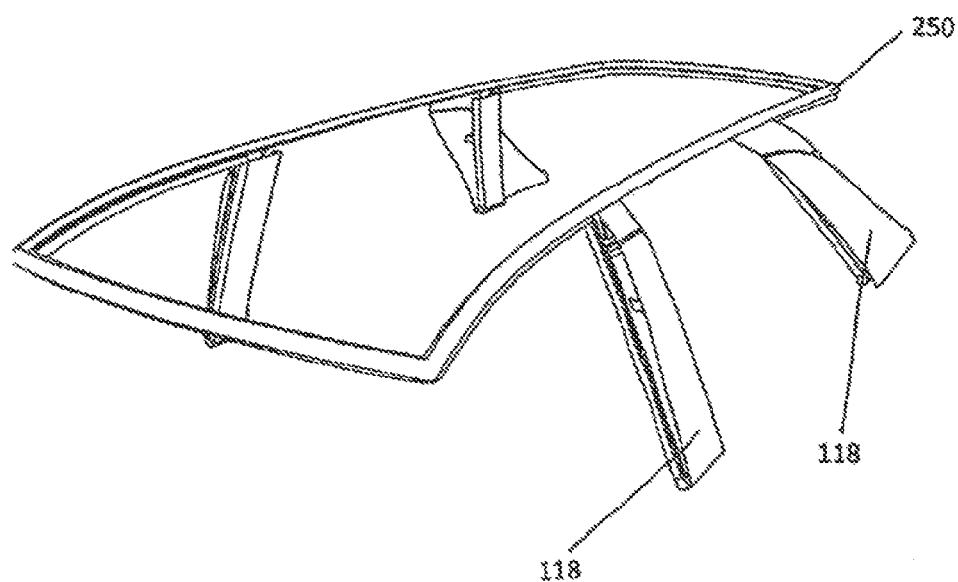
FIG. 26 Perspective view of an additional embodiment of a movable roof rack in the travel position.
Figure 27:
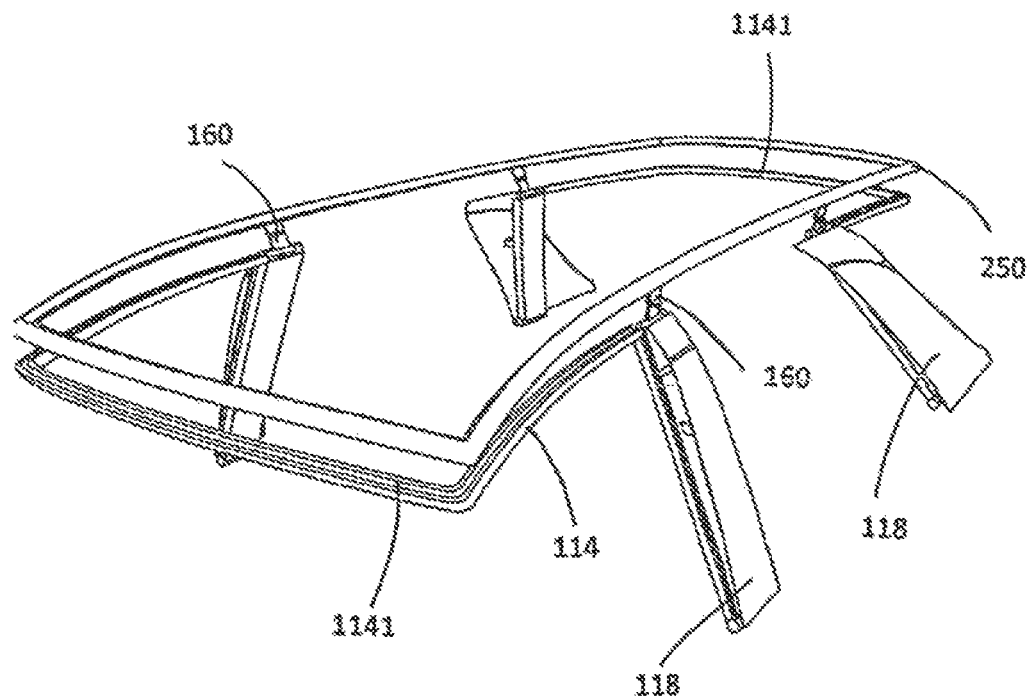
FIG. 27 View from FIG. 26 with setup support frame.
Figure 28:
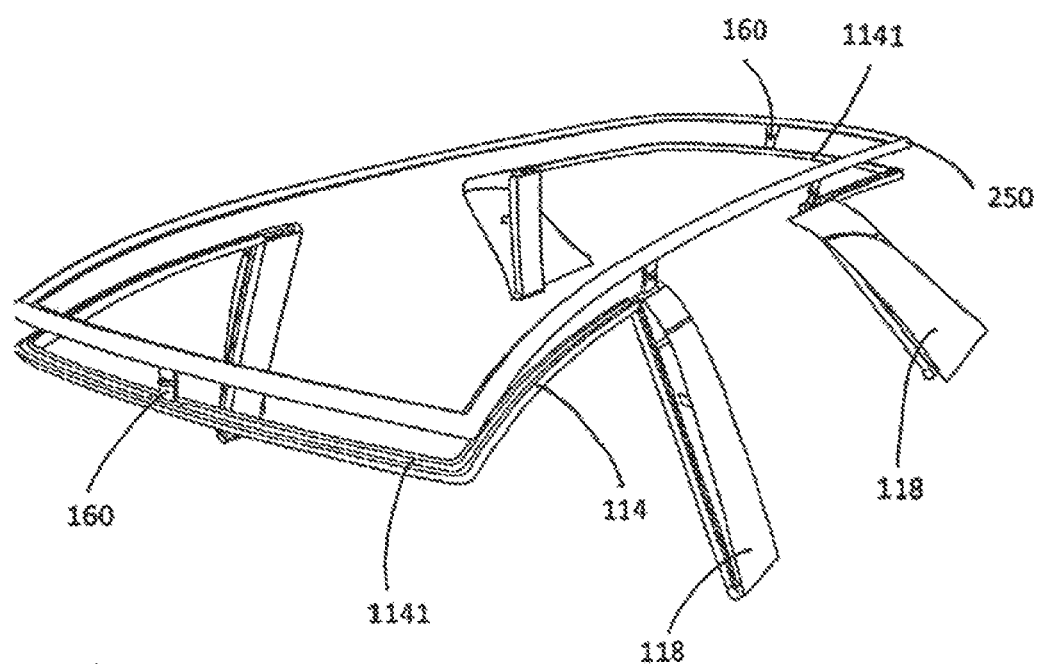
FIG. 28 View from FIG. 27 with moved moving elements.
Figure 29:
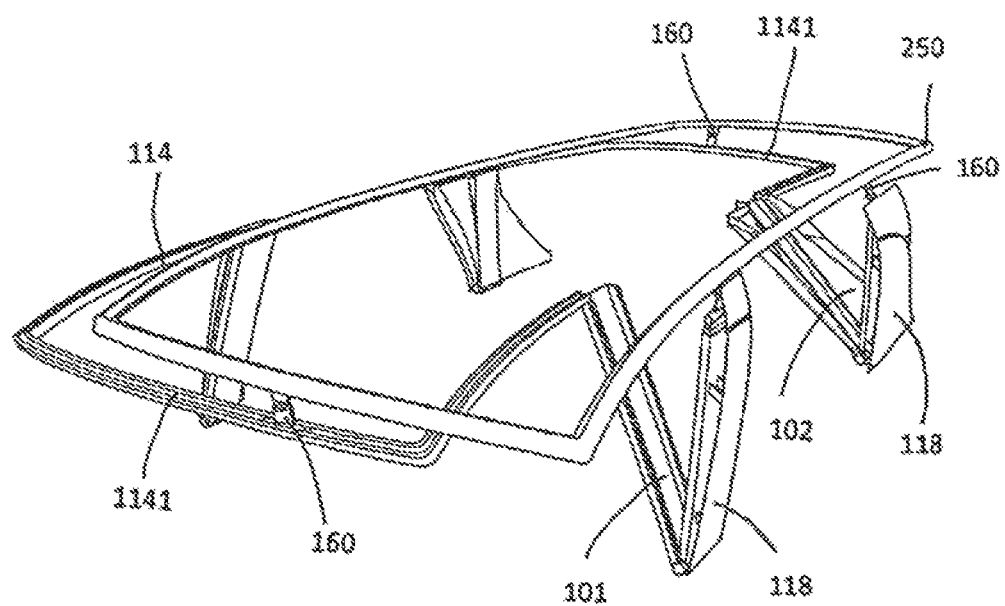
FIG. 29 Roof rack from FIG. 26 in an intermediate position.
Figure 30:
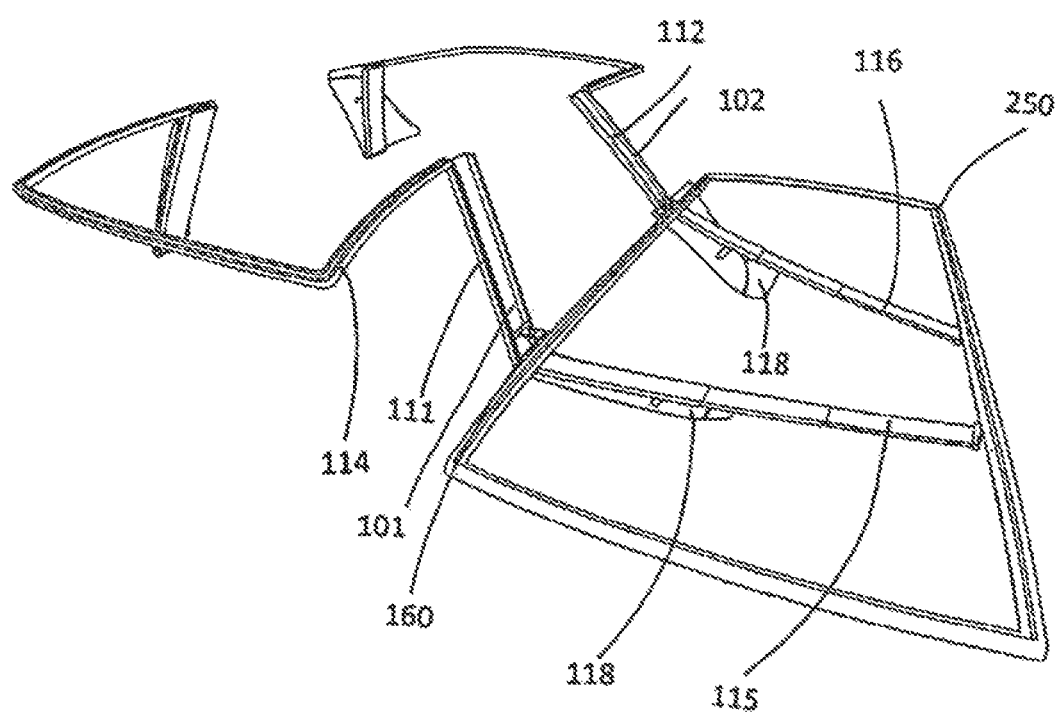
FIG. 30 Roof rack from FIG. 26 in a loading position.

FIG. 26 to 30 show another embodiment of a roof rack. A support frame 250 is provided in this case. In FIG. 26, the support frame 250 is in the travel position. The profiled support sections 115, 116 are covered by vehicle pillar covers designed as facing 118. The support frame 250 lies on the roof guide 114. In FIG. 27, it can be seen that the support frame 250 is set up after moving elements 160 have been swung up. Moving elements 160 are provided on the upper end area of a profiled support section so that, on both B-pillars and on both C-pillars, a total of four moving elements 160 are provided. As the support frame 250 moves further, the rear two moving elements 160 first move along the roof guide. In FIG. 28, it can be seen that the two rear moving elements 160 first move in the longitudinal direction of the motor vehicle to the front, or respectfully rear of the vehicle roof, then follow the curvature in the corner area and move perpendicular to the longitudinal direction toward the front moving elements 160. Once the rear moving elements 160 go beyond a point that is approximately in the middle of the two transverse sections 1141 of the roof guide 114 that run perpendicular to the longitudinal direction of the motor vehicle, the upper areas of the profiled support sections 115, 116 begin to swing away from the vehicle pillar 101, 102 assigned to them (FIG. 29). The connection between the profiled support section 115, 116 and the support frame 250 is established by the front moving elements 160. FIG. 30 shows the support frame 250 in the loading position. The rear moving elements 160 have already traveled into the vehicle pillar guides 111, 112 from the roof guide 114, and have moved along the vehicle pillar guide 111, 112 from top to bottom to a lower end position. The telescoping arms of the profiled support section 115, 116 are extended to the maximum in this position.

Figure 31:
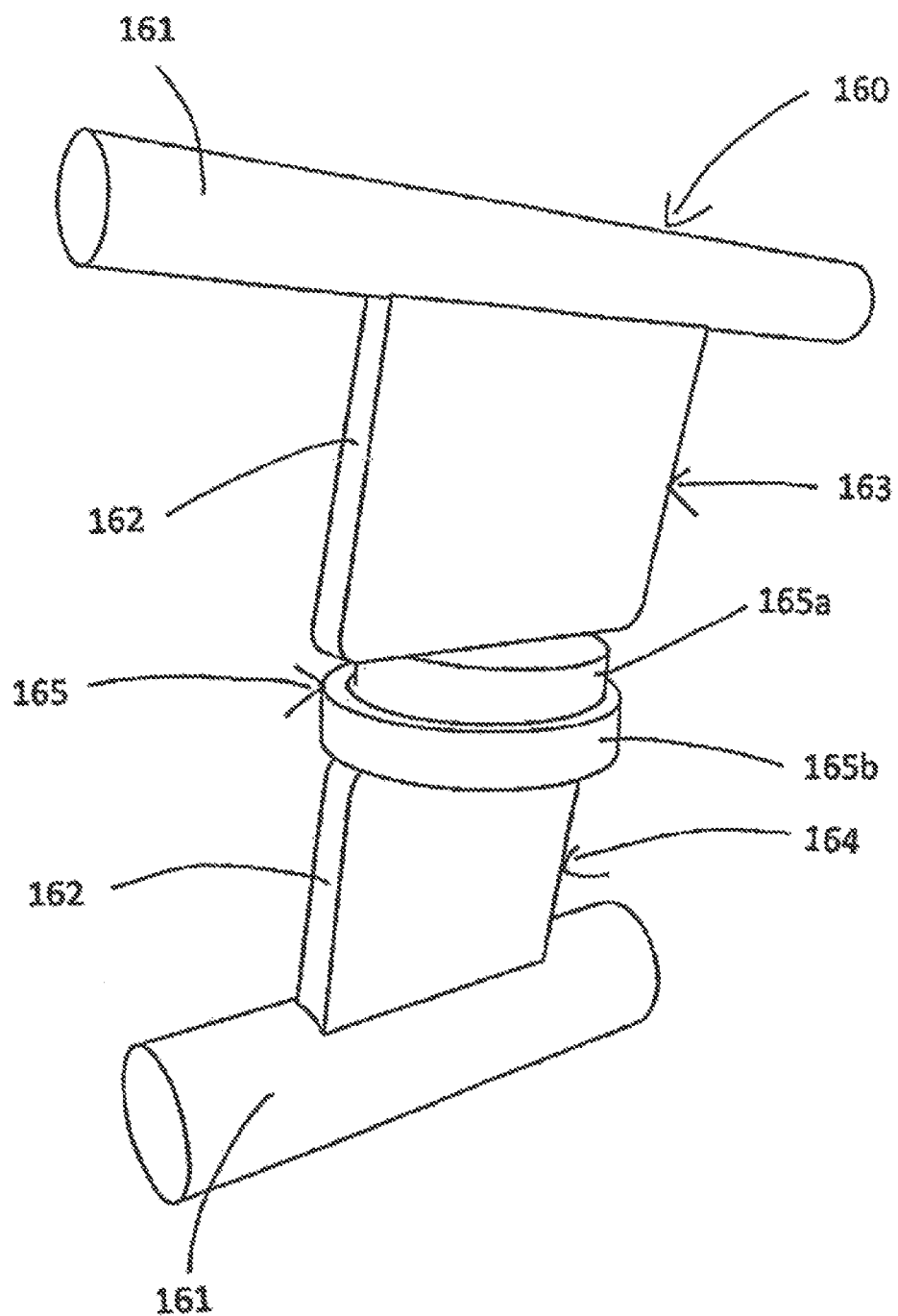
FIG. 31 Detailed view of a two-part moving element.
Figure 32:
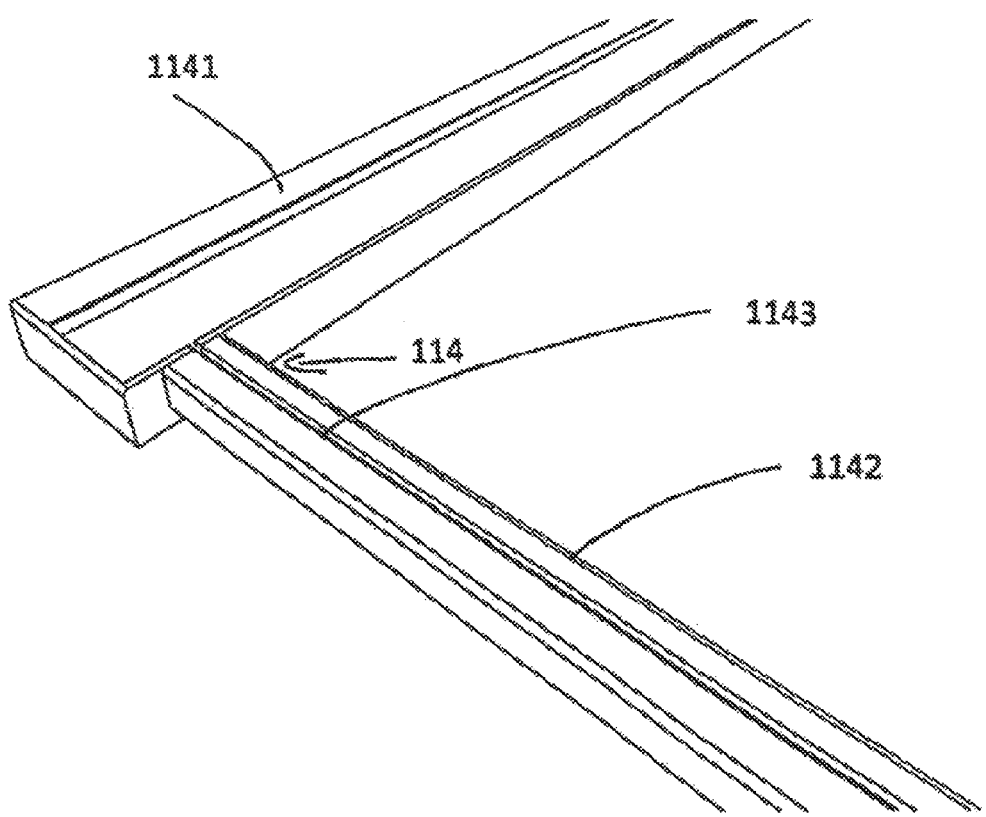
FIG. 32 Detailed view of a section of a roof guide.
Figure 33:
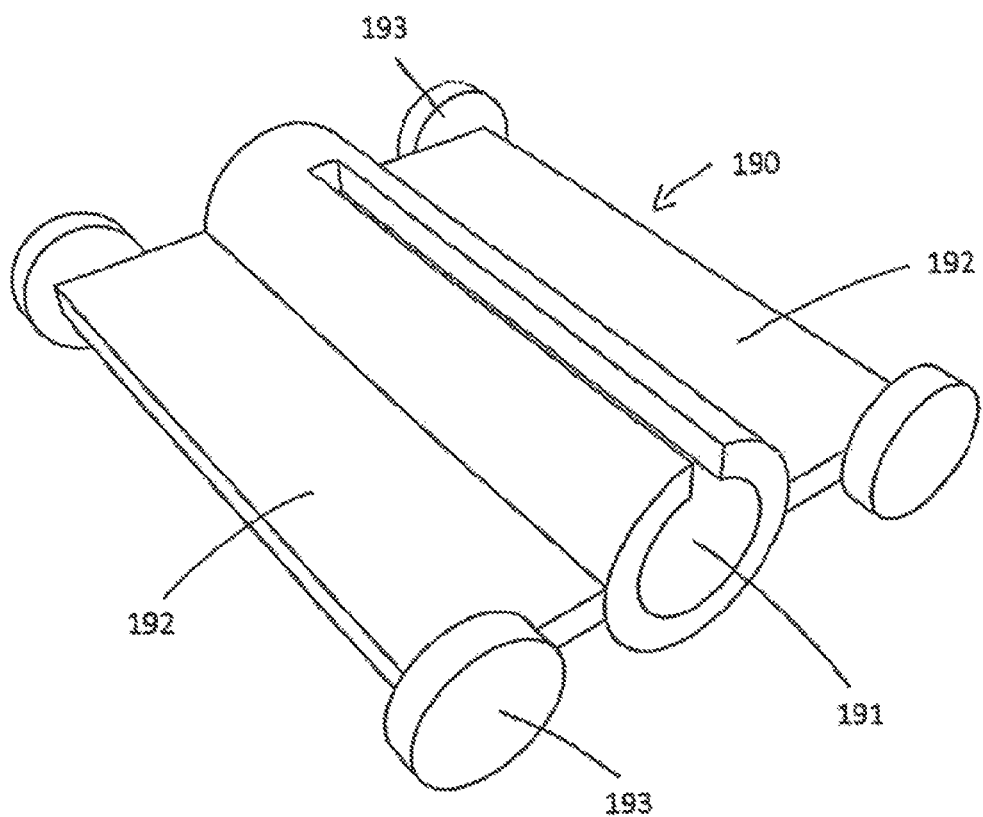
FIG. 33 Detailed view of a slide for a roof guide.
Figure 34:
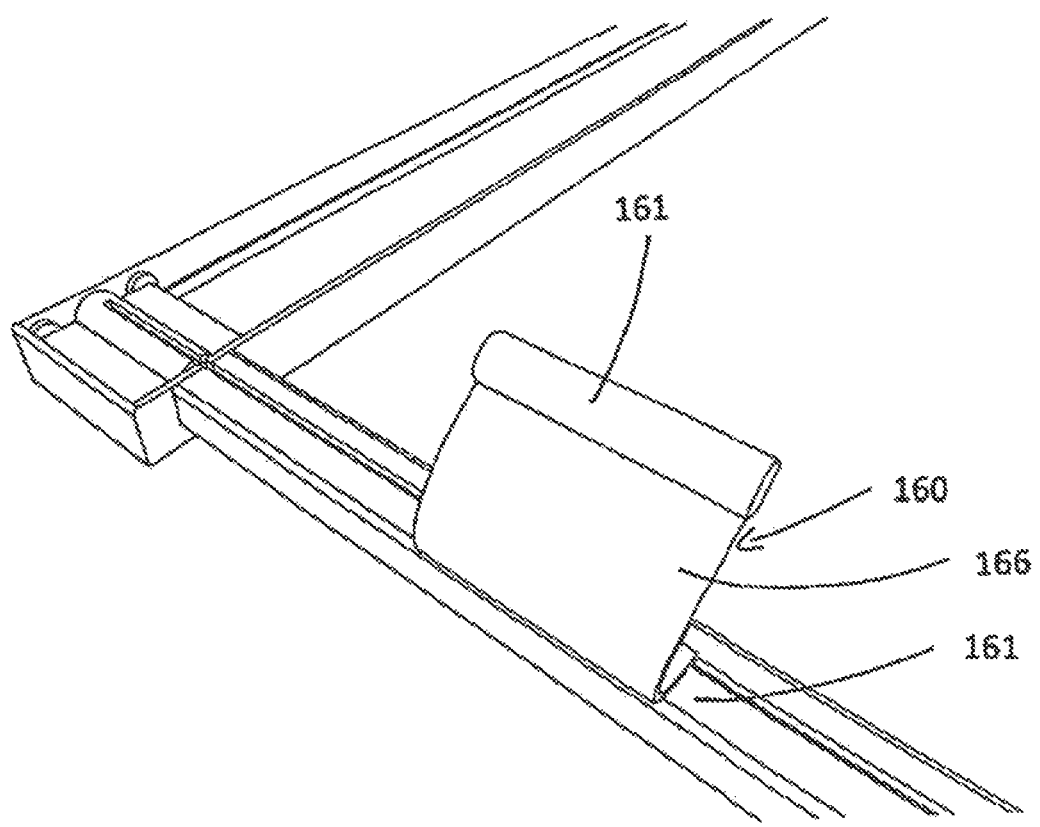
FIG. 34 View from FIG. 32 with a slide and moving elements.

FIG. 31 shows a moving element as is, for example, used in the embodiments in FIG. 22 to 30. The moving element 160 has a two-part design with an upper part 163 and a lower part 164. In its bottom end areas, the two parts 163, 164 each have a perpendicularly-running transverse bar 161. The diameter of the two transverse bars 161 are designed to be adapted to the guides, or respectively grooves, in which the two rods are to engage. With the two parts 163, 164, a middle bar 162 abuts the transverse bars 161 in the middle. The inner sides of the two middle bars 162 each terminate in coupling elements 165a, 165b and jointly form an articulated connection 165 between the two parts 163, 164 of the moving element 160. The articulation 165 is designed as a pivot joint so that the two parts 163, 164 can pivot relative to each other. This is in particular advantageous since the moving element can then move around curved areas, curvatures, corners, etc.

Figure 35:
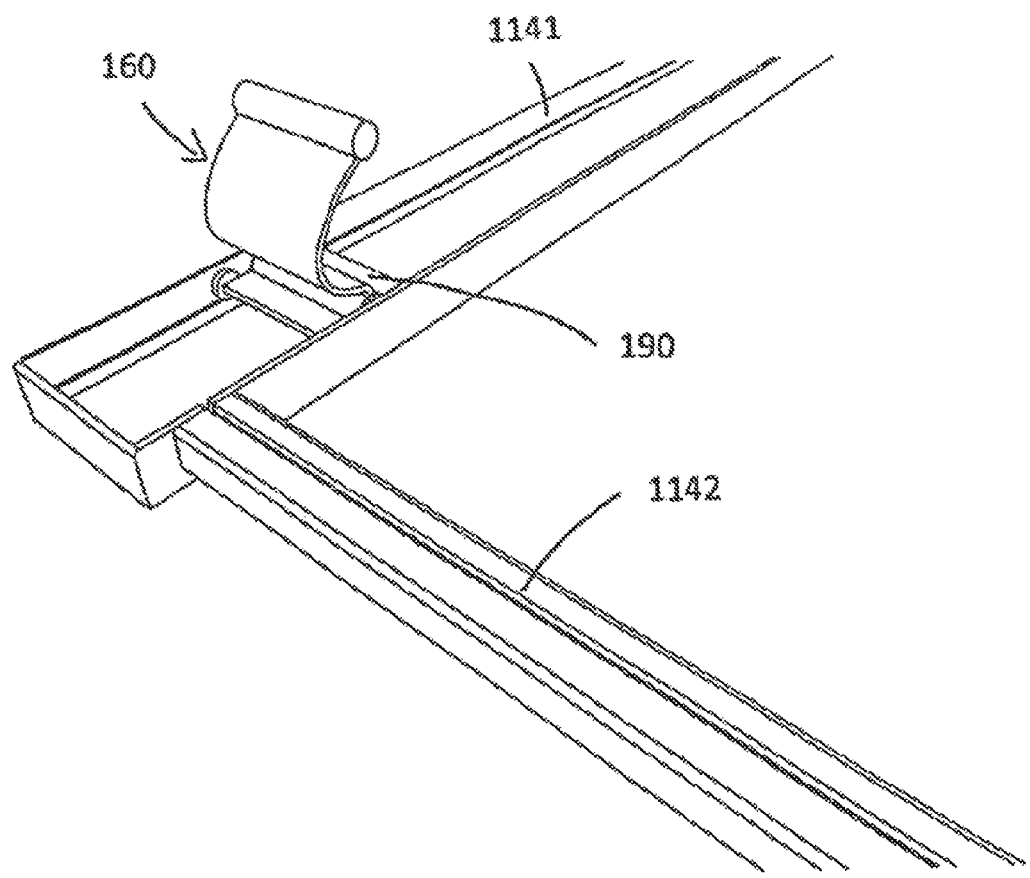
FIG. 35 View from FIG. 34 with the moving elements arranged on the slide.
Figure 36:
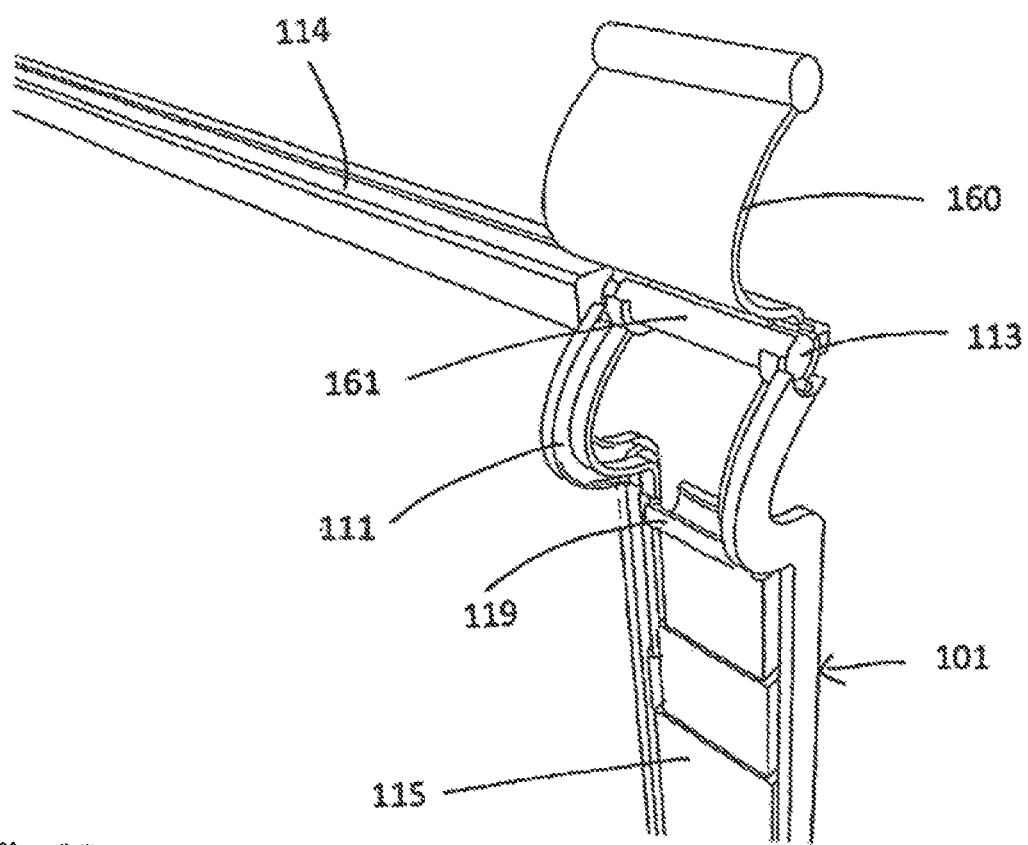
FIG. 36 Detailed view of a section of a roof guide, pillar guide and profiled support section.
Figure 37:
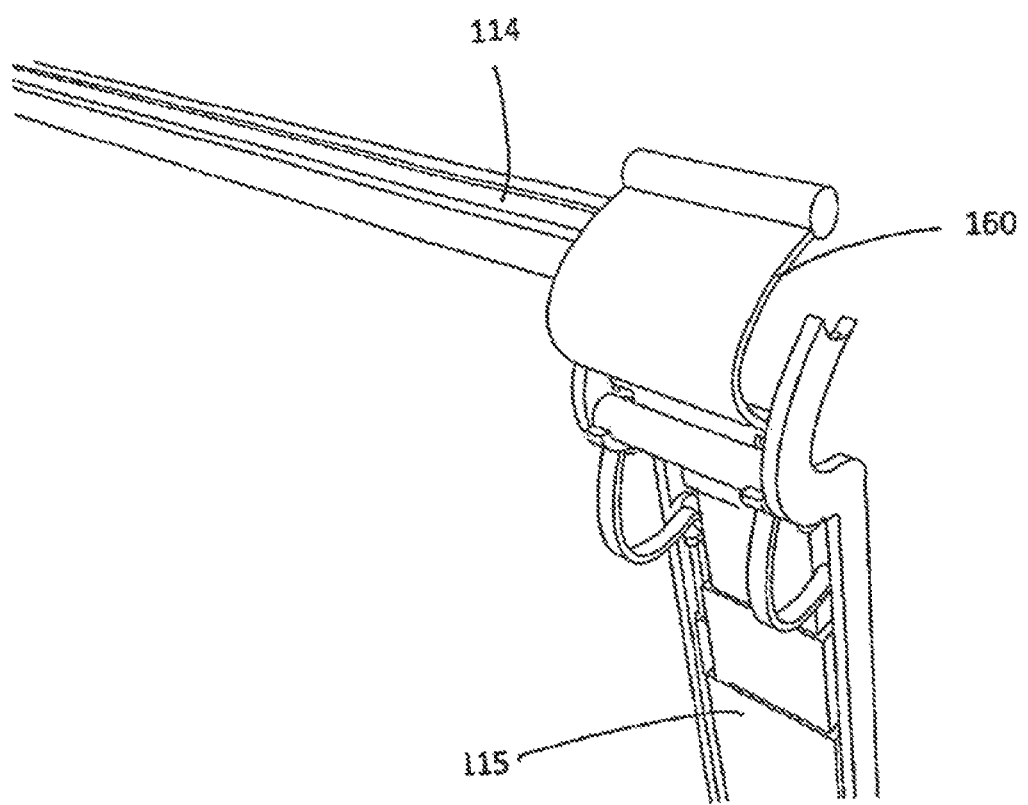
FIG. 37 Figure from FIG. 36 in a different moved state.

FIG. 32 to 35 show a detailed view of an area of a roof guide 114 with associated moving elements 160 and slides 190. The roof guide 114 has a transverse section 1141 and a longitudinal section 1142. The longitudinal section 1142 has a rounded profile with an opening that faces upward. The moving element 160 comprises an upper and lower transverse rod 161. Both are connected by means of a curved middle plate 166. The lower transverse rod 161 is dimensioned so that it can engage in a form fit in the profile of the longitudinal sections 1142 of the roof guide 114. The middle plate 166 can project upward from the roof guide, or respectively the longitudinal section 1142, through the upwardly facing opening in the profile. The moving element 160 can move with its bottom transverse rod 161 along the longitudinal section 1142. An opening 1143 between the two roof guide sections 1141, 1142 is provided at the connecting point to the transverse section 1141. The bottom transverse rod 161 of the moving element 160 can be guided through this opening from the longitudinal section 1142 into the transverse section 1141. A slide 190 is arranged in the longitudinal section 1142 that is designed as a track with a U-profile. This is shown in a detailed view in FIG. 33. The slide 190 has a middle seat 191 for the bottom transverse rod 161 of the moving element 160. A bar 192 projects on each side of the seat 191, and its end areas are provided with wheels 193. The slide 190 can move with the wheels 193 in the transverse section 1141. FIG. 35 shows that the moving element 160 is coupled to the slide 190, i.e., the bottom transverse rod 161 of the moving element 160 engages in the seat 191 of the slide 190. In this state, the moving element 160 can move together with the slide 190. With this embodiment, the different directions of movement of the transverse sections 1141 and the longitudinal sections 1142 can be handled relatively easily with a simply designed moving element 160. In particular, the moving element can be constructed very simply. A two-part design of the moving element with parts that rotate relative to each other is unnecessary.

Figure 38:
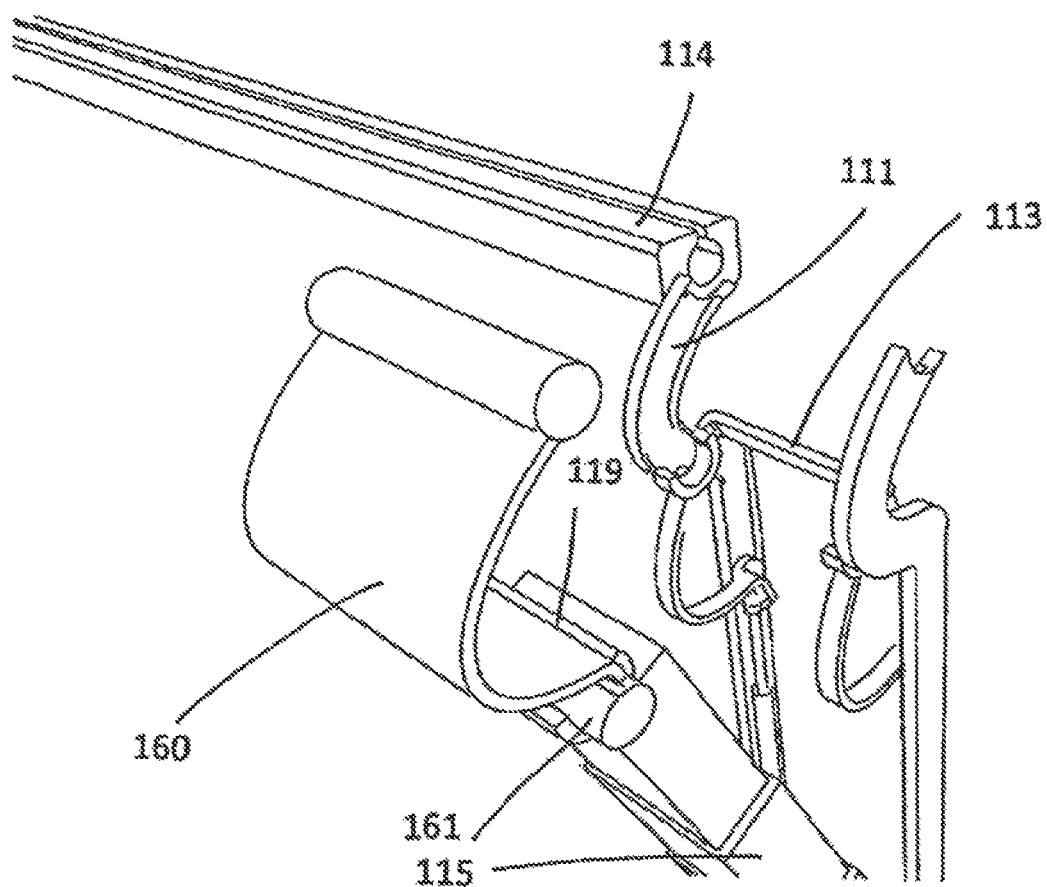
FIG. 38 Figure from FIG. 36 in a different moved state.
Figure 39:
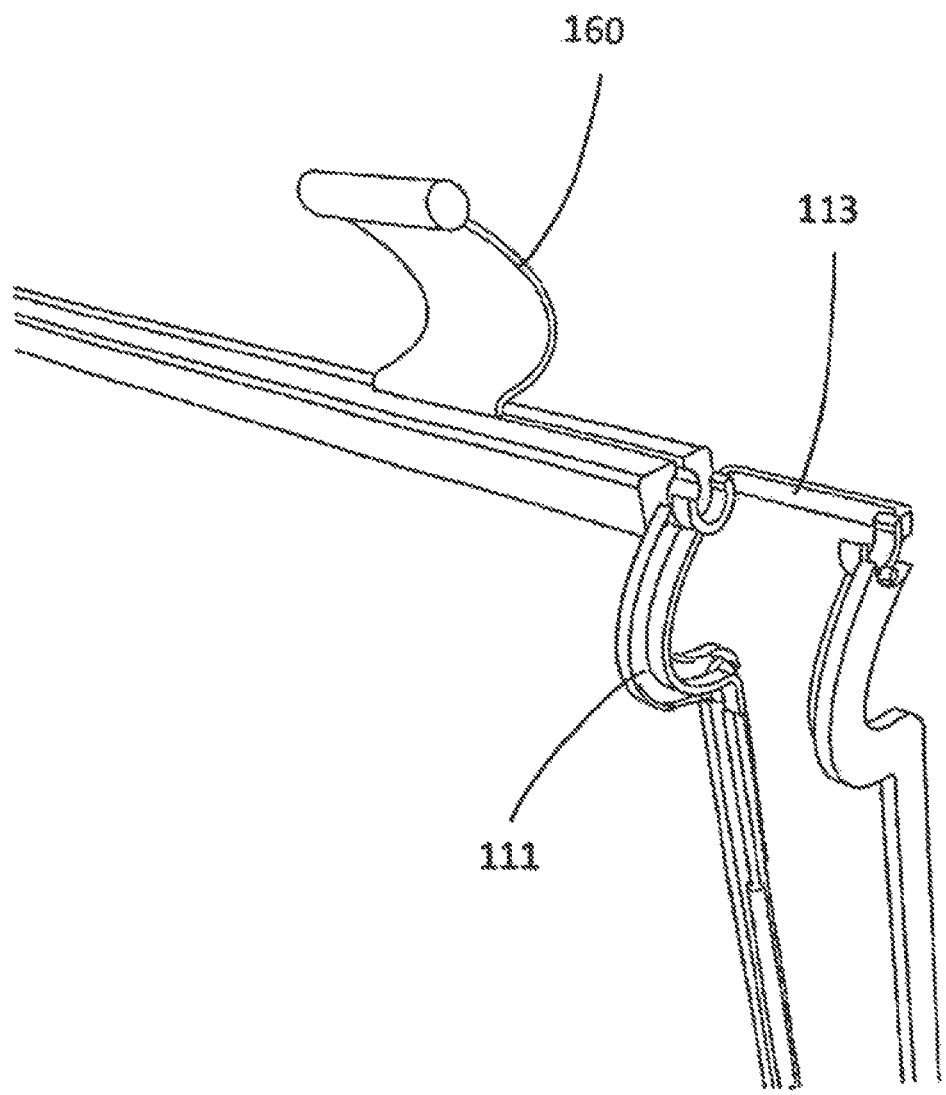
FIG. 39 Figure from FIG. 36 in a different moved state.
Figure 40:
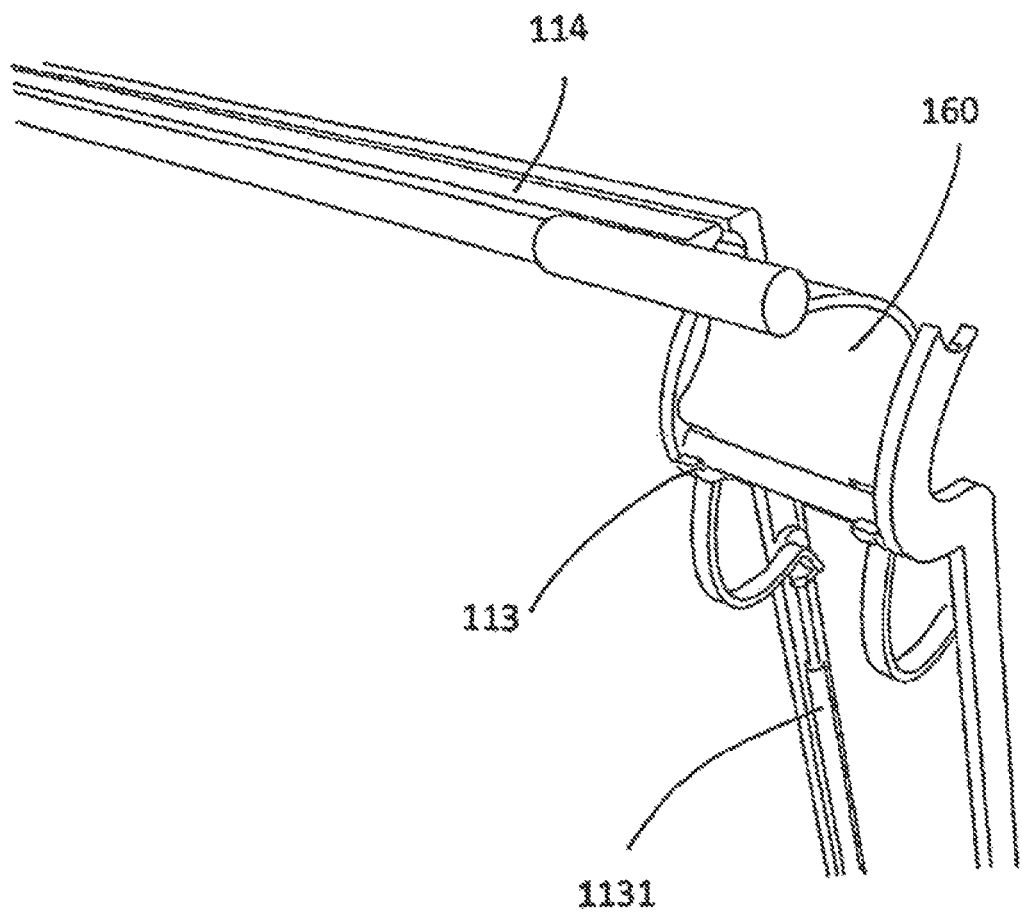
FIG. 40 Figure from FIG. 36 in a different moved state.

FIG. 36 to 40 shows a detailed view of an upper section of a vehicle pillar 101 with a profiled support section 115 and a roof guide 114 following the vehicle pillar guide 111 of the vehicle pillar 101. Furthermore, a moving element 160 is depicted that is designed corresponding to the representation in FIG. 32 to 35. At the upper end of the column guide 111 that has two internal grooves of the same design arranged opposite each other, a mounting clip 113 is provided with which the moving element 160 can move jointly in the column guide 111 (see for example FIGS. 36, 36 and 39). The mounting clip 113 can be moved by the lifting cylinder 1131 along the column guide 111. In the upper end area of the profiled support section 115, a seat device 119 is provided in which the bottom transverse rod 161 of the moving element 160 can engage. The moving element 160 can be transferred by the mounting clip 113 to the seat device 119 (see FIG. 37). Once the transfer has occurred, the moving element 160 sits securely on the seat device 119 of the profiled support section 115 and can be pivoted together therewith (see FIG. 38). To this end, the vehicle pillar guide 111 is provided with a cutout (not shown) through which the bottom transverse rod 161 of the moving element can exit from the vehicle pillar guide 111 triggered by the pivoting of the profiled support section 115 (FIG. 38). As shown in FIG. 38, once the moving element 160 swings away from the motor vehicle together with the profiled support section 115, another moving element (as shown in FIGS. 39 and 40) can be accommodated by the mounting clip 113 and move along the vehicle pillar guide 111 to the lower end of the vehicle pillar guide. This is the case when the loading position is to be achieved. These additional moving elements 160 to be moved to the bottom end of the column guide 111 lie opposite the moving element 160 accommodated by the profiled support section 115 when the roof box is in the travel position (FIG. 38).

LIST OF REFERENCE NUMBERS

101, 201 Vehicle pillar (B-pillar)
102, 202 Vehicle pillar (C-pillar)
104 Cross bars
104*a* Front cross bar
104*b* Rear cross bar
105 Cable
107 Retaining element
108 Angled element
109 Spring
111 Vehicle pillar guide
112 Vehicle pillar guide
113 Mounting clip
1131 Lifting cylinder
114 Roof guide
114*a* Rear roof guide
114*b* Front roof guide
1141 Transverse sections of the roof guide
1142 Longitudinal sections of the roof guide
1143 Roof guide C-leg
1143 Opening
115 Profiled support section
116 Profiled support section
117 Support rod
118 Facing
119, 140 Seat device
120 Shaft
121, 221, 221*a*, 221*b* Foot element
122 Wheels
173 Retaining plate
124 Retaining opening
175 Deflection roller
126 Foot element articulation
133 Seat opening
141 Seat eyelet
160 Moving element
161 Transverse rod
162 Middle bar
163 Upper part of the moving element
164 Lower part of the moving element
165 Articulation
165*a*, 165*b* Coupling element
166 Center plate
170 Support body
171 Individual piece
172 Outer end of the support body
175 Notch
180 Transverse guide
181 Strip articulation
190 Slides
191 Seat
192 Bar
193 Wheels
200 Motor vehicle
201 Vehicle pillar
202 Vehicle pillar
211 Vehicle pillar guide
212 Vehicle pillar guide
214 Roof guide
214*a* Front roof guide
214*b* Rear roof guide
215 Profiled support section
216 Profiled support section
217 Roof recess
218 Support profile articulation
219 Upper articulation
230 Vehicle roof
231 Roof edge
232 Sunroof
250 Support frame
251 Frame guide
252 Longitudinal side rail of the support frame
253 Transverse side rail of the support frame
254 Pin
260 Roof box
261 Floor walls
262 Side wall
263 Roof wall

What is claimed is:

1. A movable roof rack for a motor vehicle, comprising:
a support device for receiving a load; and
at least one profiled support section configured to support movement of the support device between a travel position and a loading position,
wherein
each of the at least one profiled support sections is configured to be at least one of in contact with and integral with a respective vehicle pillar extending between a roof and a body portion of the motor vehicle, and
the support device when in the travel position is in a travel position orientation, and during the movement between the travel position and the loading position the support device remains in the travel position orientation.

2. The movable roof rack according to claim 1, wherein each of the least one profiled support sections is connected at a first end region to the respective vehicle pillar and at a second end region to the support device, and
the loading position is below the travel position.

3. The movable roof rack according to claim 2, wherein the travel position is at an upper surface of the vehicle, and the loading position is adjacent to a side of the motor vehicle.

4. The movable roof rack according to claim 3, wherein the roof rack is at least one of
    integrated in the body of a motor vehicle,
    provided with attachment means of the support device configured to attach at least one loading device, and configured such that the support device can be moved to opposite sides of the motor vehicle.

5. The movable roof rack according to claim 4, wherein the at least one loading device is a roof box.

6. The movable roof rack according to claim 1, further comprising:
    at least one roof guide on the vehicle roof extending from an upper section of at least one of the vehicle pillars at which a respective one of the at least one profiled support sections is arranged,
    wherein at least parts of the support device are movable along the roof guide.

7. The movable roof rack according to claim 6, wherein the respective pillars include two pillars opposite of one another on opposite sides of the motor vehicle at each of vehicle longitudinal positions A at a front region of the vehicle roof, B located rearward of the A position and C located rearward of the B position, the two pillars at position A being A-pillars, the two pillars at position B being B-pillars and the two pillars at position C being C-pillars,
    the roof guide includes at least one of a front roof guide and a rear roof guide,
    when present the front roof guide extends on the vehicle roof approximately perpendicular to a longitudinal axis of the motor vehicle between the opposing B-pillars, and
    when present the rear roof guide extends on the vehicle roof between the opposing C-pillars, the rear roof guide between the C-pillars extending approximately perpendicular to the longitudinal axis of the motor vehicle or approximately along an edge of the vehicle roof.

8. The movable roof rack according to claim 1, wherein the support device includes at least one of
    one or more cross bars,
    one or more longitudinal bars, and
    a support frame, and
    each of the least one profiled support sections is arranged on, and extends substantially along, the respective vehicle pillar, and
    each of the at least one profiled support sections is telescopically adaptable in length.

9. The movable roof rack according to claim 8, wherein each of the least one profiled support sections is one of a dual telescoping arm, a triple telescoping arm or a quadruple telescoping arm.

10. The movable roof rack according to claim 1, wherein each of the at least one profiled support sections is connected to the respective vehicle pillar at a bottom section by a profiled support section articulation in an area of an attachment of a door of the motor vehicle, and
    the at least one profiled support is pivotable about a pivot axis of the profiled support section articulation.

11. The movable roof rack according to claim 10, wherein the profiled support section articulation includes a conical swivel pin.

12. The movable roof rack according to claim 11, wherein the profiled support section articulation including the conical swivel pin is located at at least one of the C-pillars.

13. The movable roof rack according to claim 1, wherein an upper section of the at least one profiled support section has a seat device to accommodate a moving element such that the at least one profiled support section is connectable to the support device to establish an articulated connection between the support device and the profiled support section articulation.

14. The movable roof rack according to claim 13, wherein the seat device at least one of
    includes a locking element arranged to permit the moving element to be released from the seat device, and
    the moving element is mounted with play in the seat device in a transverse direction relative to the at least one profiled support section.

15. The movable roof rack according to claim 6, further comprising:
    a vehicle pillar guide provided on each vehicle pillar on which the at least one profiled support section is provided,
    wherein
    each vehicle pillar guide abuts an adjacent one of the at least one roof guide at an angle,
    the support device is movable along the vehicle pillar guide, and
    the vehicle pillar guide at least one of extends along the respective vehicle pillar and is provided with a vehicle pillar guide cover configured to cover at least one of the at least one profiled support section and the vehicle pillar guide when the support device is in the travel position.

16. The movable roof rack according to claim 15, wherein a shape of the vehicle pillar guide cover is adapted to a body shape of the motor vehicle.

17. The movable roof rack according to claim 16, wherein at least one of the vehicle pillar guide, the roof guide and the support device includes one or more tracks,
    the one or more tracks have a profile configured to accommodate a moving element,
    the profile is one of a U-profile, L-profile, semicircle profile, C-profile, T-profile, or a near circle profile,
    at least one slide is movably mounted on at least one of the vehicle pillar guide, the roof guide and the support device,
    the slide is movable along the at least one of the vehicle pillar guide, the roof guide and the support device, and
    the slide is configured to accommodate the moving element such that the moving element is movable with the slide.

18. The movable roof rack according to claim 17, wherein the moving element is connected to at least one of the support device, the vehicle pillar guide and the roof guide,
    the moving element engages in the profile of at least one of the tracks to support movement of the support device along the track, and
    the moving element has profile counterparts on two opposing end sides.

19. The movable roof rack according to claim 18, wherein the two opposing end sides of the moving element are connected to the profile counterparts by a center plate having an asymmetrical bulge portion, or the two opposing end sides of the moving element are each connected to one of two parts of the moving element parts, and the two parts of the moving element are at least one of articulated and movably connected to each other.

20. The movable roof rack according to claim 1, wherein
a seat opening for accommodating a moving element in the travel position is provided in at least one of the vehicle body of the motor vehicle the roof rack,
a sealing element is provided to seal the seat opening when the support device is in the travel position,
actuation means are provided to at least one of open a sealing means when the support device moves from the travel position and close the sealing means when the support device moves into the travel position,
attachment means are provided on the sealing element to attach loading devices,
two of the profiled support sections provided on a side of the motor vehicle are connected to each other by a stabilization profile having a foldable vehicle roof strip or a support rod, and
the vehicle roof includes a roof recess configured to accommodate and guide the roof rack.

21. The movable roof rack according to claim 20, wherein
the support rod has free end areas movably connected to the support device such that the support rod is movable at least sectionally relative to the support device.

22. The movable roof rack according to claim 1, further comprising:
a drive arranged to at least one of move the support device and to telescopically move the at least one profiled support section,
wherein
the drive includes at least one of a pneumatic drive, a hydraulic drive, an electric motor, a gravity drive, a winch and a spring force drive,
a supply line runs along or within components of the roof rack to supply energy consuming devices of at least one of the roof rack a loading device arranged on the roof rack.

23. The movable roof rack according to claim 22, wherein
the supply line is coupled to at least one of a supply line for a door, luggage compartment flap, a windshield wiper arranged on a rear window and an engine compartment of a motor vehicle.

24. The movable roof rack according to claim 22, wherein
the loading device is a roof box arranged on the roof rack.

25. The movable roof rack according to claim 1, further comprising:
at least one deformable support body on at least one of the vehicle roof and the body of the motor vehicle, the at least one deformable support body being configured to support the support device in the loading position,
wherein
the at least one deformable support body is movable with the support device along a path of movement provided on the motor vehicle roof or on the body of the motor vehicle.

26. The movable roof rack according to claim 25, wherein the support body is at least one of
releasably connected to the support device by a catch provided on the support body or on the support device,
formed in multiple parts movably connected to each other, and
formed from an elastically deformable material.

27. The movable roof rack according to claim 1, further comprising:
a control device configured to control the movement of the support device between the travel position and the loading position.

28. The movable roof rack according to claim 27, wherein
the at least one profiled support section is telescopically adaptable in length and connected at a bottom section by a support profile articulation to the respective vehicle pillar,
the at least one profiled support section is pivotable about a pivot axis of the support profile articulation,
an upper section of the at least one support profile has a seat device configured to accommodate a moving element arranged to connect the at least one support profile to the support device,
the control device controls the adaptation of the length of the at least one support section based on one of the position of the support device during movement between the travel position and the loading position or predetermined position parameters during the movement.

29. A roof of a motor vehicle, comprising:
a movable roof rack according to claim 1 integrated into one or more roof recesses configured to accommodate the movable roof rack.

30. A motor vehicle, comprising:
a roof; and
a movable roof rack according to claim 1.

* * * * *